(12) United States Patent
Darty

(10) Patent No.: US 6,173,440 B1
(45) Date of Patent: Jan. 9, 2001

(54) METHOD AND APPARATUS FOR DEBUGGING, VERIFYING AND VALIDATING COMPUTER SOFTWARE

(75) Inventor: Mark A. Darty, Harvest, AL (US)

(73) Assignee: McDonnell Douglas Corporation, Huntsville, AL (US)

( * ) Notice: Under 35 U.S.C. 154(b), the term of this patent shall be extended for 0 days.

(21) Appl. No.: 09/085,386

(22) Filed: May 27, 1998

(51) Int. Cl.[7] .................................................. G06F 9/445
(52) U.S. Cl. ..................................... 717/4; 717/1; 717/11
(58) Field of Search .................................... 395/701, 702, 395/703, 704, 705; 717/1, 11, 4

(56) References Cited

U.S. PATENT DOCUMENTS

| | | | |
|---|---|---|---|
| 5,805,890 | * 9/1998 | Simons et al. | 395/704 |
| 5,805,892 | * 9/1998 | Nakajima | 395/704 |
| 5,815,714 | * 9/1998 | Shridhar et al. | 395/704 |
| 5,835,511 | * 11/1998 | Christie | 371/49.3 |
| 6,044,219 | * 3/2000 | Lips | 395/704 |

OTHER PUBLICATIONS

IBM Technical Disclosure Bulletin, "Software Diagnostic Routine for Failing Chip Isolation", vol. 29, No. 11, pp. 5079–5080, Apr. 1987.*
IBM Technical Disclosure Bulletin, "Error–Reporting Registers", vol. 30, No. 6, pp. 79–80, Nov. 1987.*
Bossen et al., "Model for Transient and Permanent Error–Detection and Fault–Isolation Coverage", IBM J. Res. Develop., vol. 26, No. 1, pp.6777, Jan. 1982.*
IBM Technical Disclosure Bulletin, "Automated Function Test Generation Method", vol. 32, No. 9A, Jan. 1990.*
IBM Technical Disclosure Bulletin, "Bug List Optimizer for Logic Failure Simulation", vol. 24, No. 6, Nov. 1981.*
IBM Technical Disclosure Bulletin, "Caculate Error Detection Effectiveness From High Level Language", vol. 32, No. 12, May 1990.*
Feldmeier, "Fast Software Implementation of Error Detection Codes", IEEE/ACM transaction on Networking, vol. 3, No. 6, pp. 640–651, Dec. 1995.*

* cited by examiner

Primary Examiner—Kakali Chaki
Assistant Examiner—Ted T. Vo
(74) Attorney, Agent, or Firm—Stout, Uxa, Buyan & Mullins, LLP; Donald E. Stout

(57) ABSTRACT

A new approach for software debugging, verification and validation is disclosed. The present invention utilizes a knowledge-based reasoning approach to build a functional model of the software code for identifying and isolating failures in the software code. The knowledge-based reasoning approach of the present invention uses the software design, which is preferably based upon a flow chart or block diagram representation of the software functionality, to build the functional model. The software block diagram contributes to the functional model by defining the inputs and outputs of the various blocks of code, as well as defining data interconnections between the various blocks of code. In accordance with a method of the present invention, test points are strategically inserted throughout the code, and each test point is associated with a corresponding block of code. Expected values of the test points for an expected proper-operation execution of the computer program are generated. The computer program is then executed on a computer, and the actual values of the test points from the program execution are compared with the expected values of the test points. Failed test points which do not agree with corresponding expected values are determined. The functional model, which includes information functionally relating the various test points to one another, is then used to isolate the failed test points to one or more sources of failure in the code.

43 Claims, 12 Drawing Sheets

METHOD AND APPARATUS FOR DEBUGGING, VERIFYING AND VALIDATING COMPUTER SOFTWARE

BACKGROUND OF THE INVENTION

1. Field of the Invention

The present invention relates generally to computers and, more particularly, to computer software debugging, verifying and validating devices and techniques.

2. Description of Related Art

The process of correcting developmental errors within computer software code is commonly referred to as debugging. A typical debugging procedure entails a software designer executing the prototype software and attempting to determine which portions of the code are responsible for incorrect operation. The software developer typically examines a failure within the software code and attempts to determine the portion, module or line of software code that is responsible for the failure.

Conventional debugging techniques include steps of inserting output statements after subsections of code to notify the developer of the results either before, during or after the execution of the remainder of the program. By incorporating output statements into the code, the developer can more quickly deduce the part or parts of code that are yielding the wrong in-process answer, thereby achieving fault isolation to the respective subsection of code. The software developer frequently employees a standard case to test and debug the code. Using a standard case, the software developer can test each result from each output statement in the code for accuracy, by comparing each result with an expected result for the standard case.

Although the process of debugging has been automated to some extent through the use of error codes and commercial debuggers for popular development languages, the process of debugging remains a very time consuming and costly part of the software development process.

Even after the software is developed, it must be verified and validated. Software verification and validation generally encompasses an acceptance process in which the software is functionally verified to be correct when its operation is compared to the required performance defined in the design specification. Operational characteristics of the software are verified within the bounds of the development specification. The verification and validation step is typically implemented both internally to the software development establishment and by the ultimate customer, such as the federal government. For example, the U.S. Department of Defense may have a software product delivered to control a missile. The U.S. Department of Defense in this instance would obviously be interested in conducting an independent verification of the functionality of the software.

The process of verifying the operation of software under all operational modes is typically a very time-consuming and costly effort, in which all possible scenarios are executed for the software, to identify its response under all conditions. The conventional approach comprises a user stepping through operational modes and measuring a software's responses. By doing so, the user can verify the software's functionality with some certainty, thereby validating it for operation in the intended application. The amount of effort required for software verification and validation is typically augmented by a user implementing extensive examination of each line of the software code. This line-by-line examination of the software code, in addition to other available techniques, is typically implemented to ensure that the software will operate properly under all operational modes. Proper functionality of the software code should include performance reliability and robust operation. Efforts continue in the prior art for enhancing the efficiency and efficacy of software debugging, verification and validation procedures, which typically must be implemented both during and after the design phase of the software is completed.

SUMMARY OF THE INVENTION

The method and apparatus of the present invention present new approaches for software debugging, verification and validation. The present invention utilizes a knowledge-based reasoning approach to build a functional model of the software code for identifying and isolating failures in the software code. The knowledge-based reasoning approach of the present invention uses the software design, which is preferably based upon a flow chart or block diagram representation of the software functionality, to build the functional model. The software block diagram contributes to the functional model by defining the inputs and outputs of the various blocks of code, as well as defining data interconnections between the various blocks of code. In accordance with a method of the present invention, test points are strategically inserted throughout the code, wherein each test point is associated with a corresponding block of code. A standard case is used to determine the expected values of the test points for an expected proper-operation execution of the software code.

The software code is then executed, and the actual values of the test points from the program execution are compared with the expected values of the test points. Failed test points which do not agree with corresponding expected values are thus determined. The functional model, which includes information functionally relating the various test points to one another, is then used to isolate the failed test points to one or more conclusive sources of failure within the code.

In accordance with one aspect of the present invention, a method of selecting a source failure test point from a plurality of test points in a computer program comprises an initial step of providing a plurality of test points in the computer program, and a subsequent step of defining at least one fault propagation path. (In another aspect of the present invention, the fault propagation path is referred to as a data propagation path.) The test points are placed into the code of the computer program, and an order of data flow among the test points is determined. The order of data flow defines at least one fault propagation path through the plurality of test points. The source failure test point is defined as having a highest probability relative to other test points in the computer program of being a source of failure. The at least one fault propagation path associates at least two of the plurality of test points and an order of data flow and data dependency within the computer program.

The method of the present invention includes a step of generating a standard case for the test points of the computer program in which expected values of the test points for an expected proper-operation execution of the computer program are generated. The computer program is then executed on a computer, and the actual values of the test points from the program execution are compared with the expected values of the test points. Failed test points which do not agree with corresponding expected values are determined. An additional step is provided for finding the source failure test point that is earliest (relative to other failure test points in the at least one fault propagation path) in an order of data flow and data dependency. The failure test points are associated with the at least one data propagation path, and the step of finding the source failure test point that is earliest includes a step of selecting the failed test point which is earliest in the at least one fault propagation path.

Another aspect of the present invention includes a method of determining a source of failure test point from a plurality of test points in a computer program. The source of failure test point has a highest probability relative to other test points in the computer program of being a source of failure. The method includes a step of determining a sequential flow of data among a plurality of test points in the computer program, and a step of ranking the plurality of test points, using the determined sequential flow of data, in an order of an earliest test point in the determined sequential flow of data to a last test point in the determined sequential flow of data, to thereby generate a ranked set of test points. (In another aspect of the present invention, the ranked set of data is generated by ranking the plurality of test points in accordance with an order of execution and data dependency of the test points.)

The method of the present invention includes a step of generating expected values of the test points for an expected proper-operation execution of the computer program. The computer program is then executed on a computer, and the actual values of the test points from the program execution are compared with the expected values of the test points. Failed test points which do not agree with corresponding expected values are determined. Each failed test point indicates an erroneous program operation or result. The method continues with a step of determining a failed test point from the plurality of failed test points that ranks earliest among failed test points in the ranked set of test points. The earliest-ranked failed test point is determined to be the source failure test point.

The step of arranging the plurality of test points can include a step of defining at least one fault propagation path. The plurality of failed test points can correspond to a single ranked group of test points which defines a fault dependency set. In another aspect of the present invention, the plurality of failed test points corresponds to a plurality of ranked groups of test points, with each ranked group of test points defining a separate fault dependency set.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Figure 1:
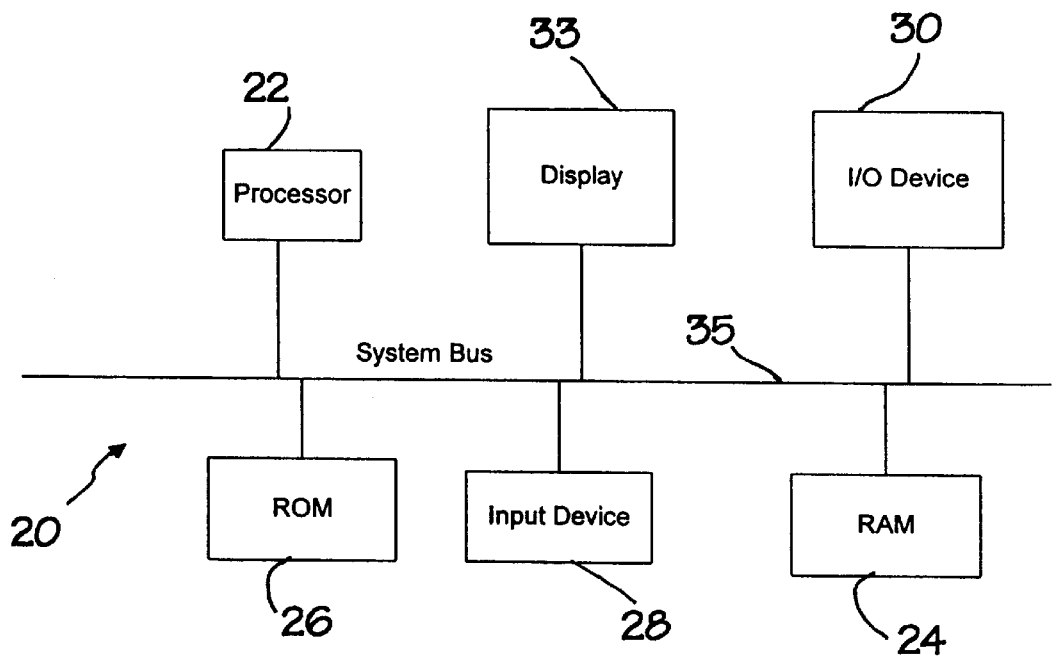
FIG. 1 is a system block diagram illustrating a number of components in accordance with an embodiment of the present invention.

Referring more particularly to the drawings, FIG. 1 illustrates a computer system 20 comprising a microprocessor 22, a Random Access Memory (RAM) 24 and a Read Only Memory (ROM) 26. The computer system 20 of the presently preferred embodiment further comprises an input device 28, such as a keyboard, and Input/Output (I/O) device 30 which may be connected to a printer, for example, and a display 33. A system bus 35 interconnects the various components. Other components and buses (not shown) may be connected to the system bus 35 for providing additional functionality and processing capabilities. A network access device may be included, for example, for providing the computer system 20 access to an Internet, intranet or other network system. The computer system 20 of the present invention is configured to implement and/or facilitate the implementation of all of the below-described processes, which are described in connection with FIGS. 2–10.

In accordance with the present invention, the computer system 20 is used as a powerful diagnostic tool for facilitating software debugging, verification and validation procedures. A knowledge-based reasoning approach is used in accordance with the present invention to build a functional model of the software code for identifying and isolating failures in the software code. The knowledge-based reasoning approach of the present invention uses the software design, which is preferably based upon a flow chart or block diagram representation of the software functionality, to build the functional model. After the functional model is built, the functional model is input into the computer system 20. The software block diagram representing the software code contributes to the functional model by defining the inputs and outputs of the various blocks of code, as well as by defining data interconnections between the various blocks of code.

In accordance with a method of the present invention, test points are strategically inserted throughout the code, and each test point is associated with a corresponding block of code. A standard case, or "test" case, is run for the code, and failed test points are determined for the standard case. The functional model, which includes information functionally relating the various test points to one another, is then used to isolate the failed test points to one or more sources of failure in the code.

In the following description, a method of the present invention is illustrated in the context of a simple example, with reference to FIG. 2. After the example, the method of the presently preferred embodiment is disclosed in greater detail with reference to the flow charts of FIGS. 3a–3d. The following FIGS. 4 and 5, and the accompanying text associated therewith, disclose examples of the method of FIGS. 3a–3d applied to particular arrangements of program code. FIGS. 6–10 discuss additional embodiments of the present invention.

The below set of Fortran code comprises a main Program "ABC" that calls a Subroutine "NONO." The subroutine CALL statement in the main program comprises two arguments "1.0" and "X," and the actual subroutine has an argument list of "A" and "B." A problem exists in the subroutine. Namely, the constant "1.0" in the CALL statement of the main program is overwritten with a value of "2" in the subroutine. As a result of this error, occurrences of "1.0" in the code after execution of the subroutine are considered by the processor as having a value of "2.0." The set of Fortran code is set forth below in Text Layout 1.

```
PROGRAM ABC
CALL NONO(1.0,X)
PRINT*, '1 +', X, '=', 1.0 + X
STOP
END
SUBROUTINE NONO(A,B)
B = 1.0
A = 2.0
RETURN
END
                Text Layout 1.
```

In accordance with the method of the present invention, a user first groups the lines of code of the above-program into functional blocks of code. The set of Fortran code is shown below partitioned into three functional blocks of code. In particular, the subroutine CALL statement in the main program is designated as the first block; the print statement in the main program is designated as the second block; and the set of code comprising the subroutine is designated as the third block, as indicated below in Text Layout 2.

```
PROGRAM ABC
CALL NONO (1.0,X)           ]Designate as first block
PRINT*, '1 +', X, '=', 1.0 + X   ]Designate as second block
STOP
END
SUBROUTINE NONO(A,B)        |
B = 1.0                     |Designate as third block
A = 2.0                     |
RETURN
END
                Text Layout 2.
```

The inputs and outputs of each of the functional blocks of code are then identified by the user. In the presently preferred embodiment, a flow chart or functional block diagram representation of the program is generated to achieve this end. The flow chart, which may already exist, preferably defines the processing flow through the various blocks of code. The flow chart further preferably defines inputs and outputs of the various blocks of code, and also defines the data interconnections between the various blocks of code.

Figure 2:
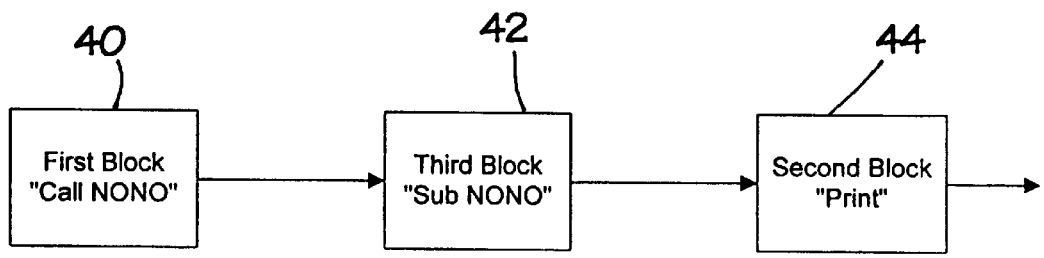
FIG. 2 is a flow chart illustrating the interconnectivity and process flow among a number of blocks of code of a first exemplary computer program in accordance with the present invention.
Figure 3A:
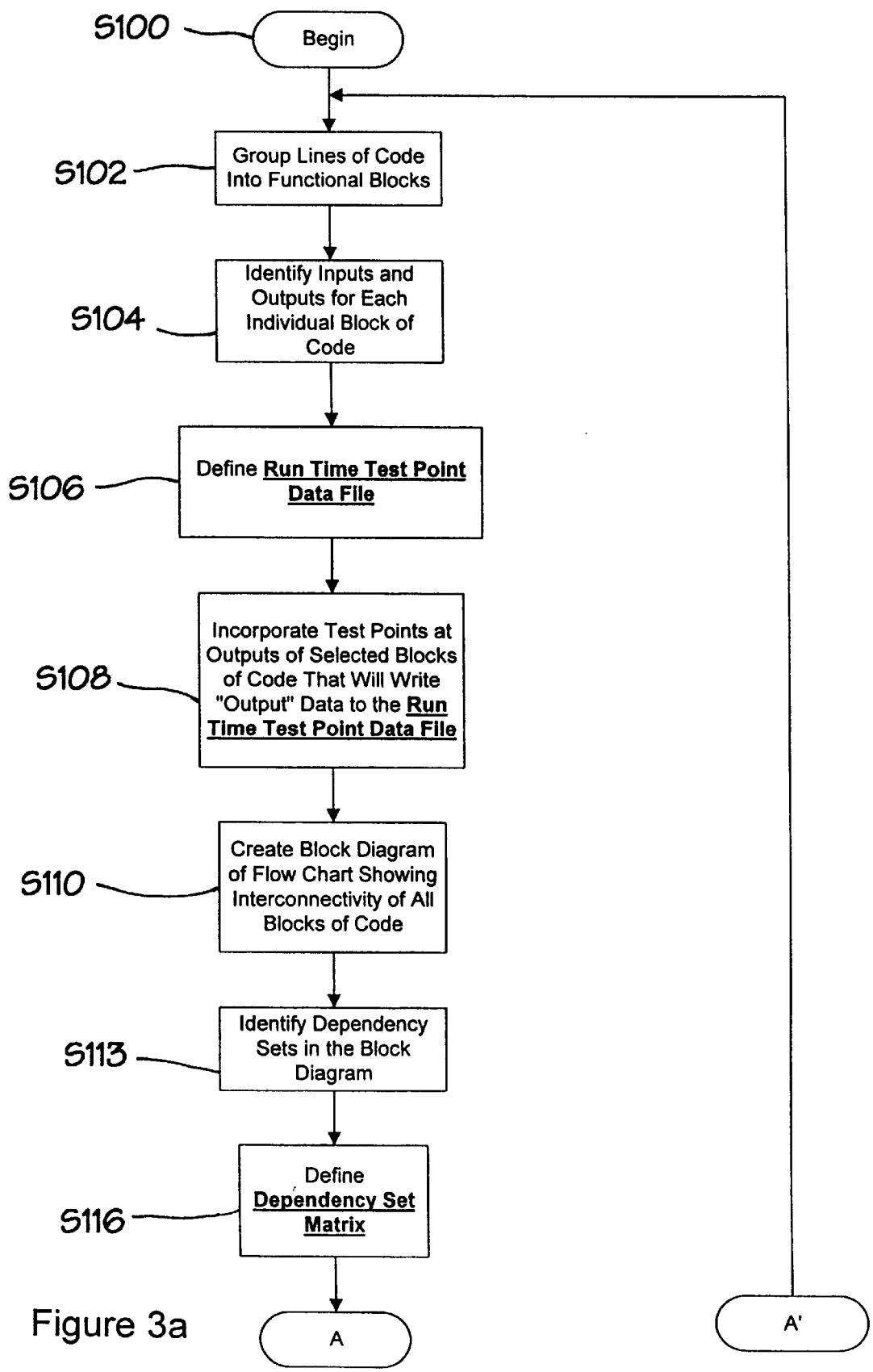
FIGS. 3a–3d comprise a flow chart illustrating the method of the presently preferred embodiment.
Figure 3B:
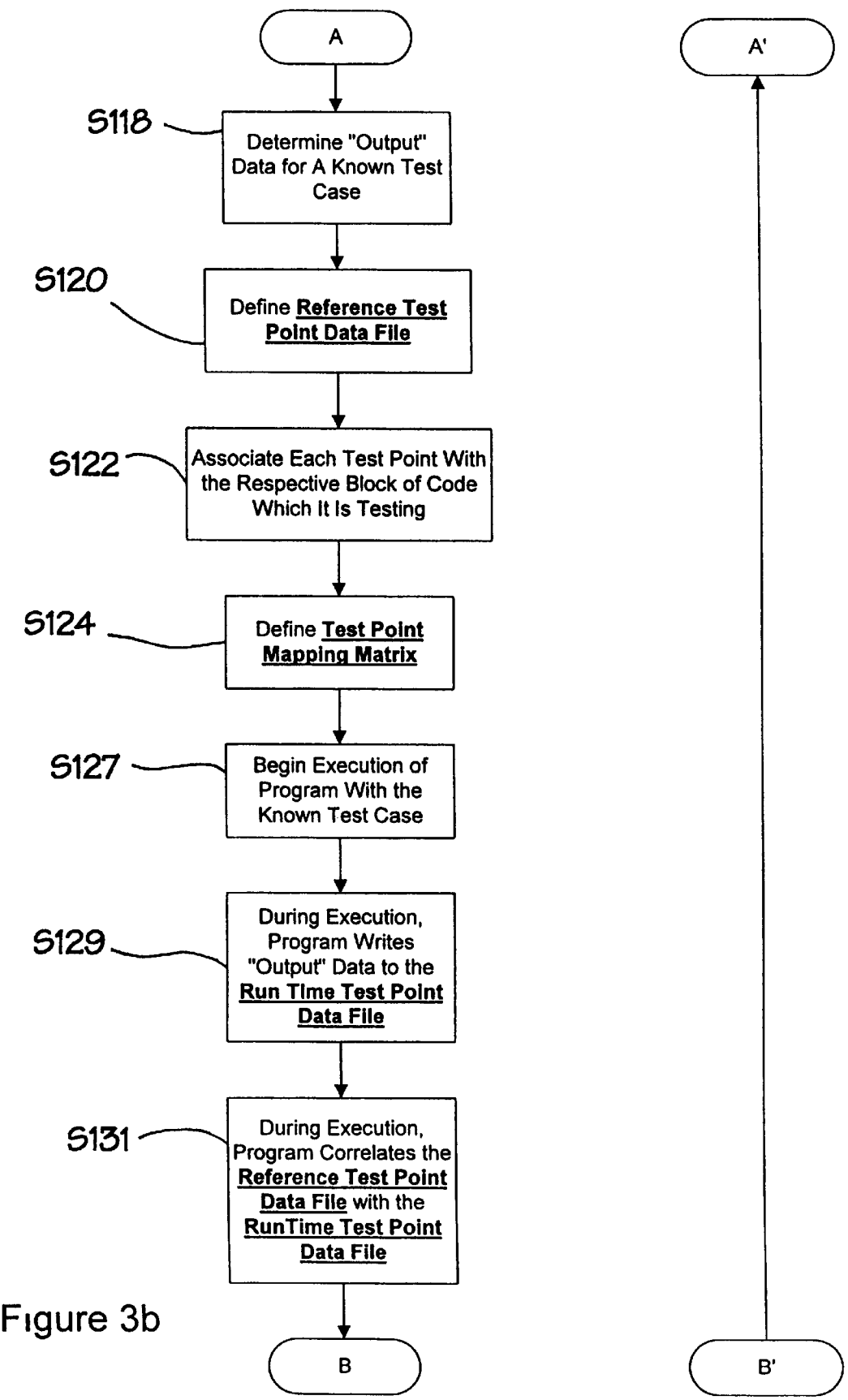
Figure 3C:
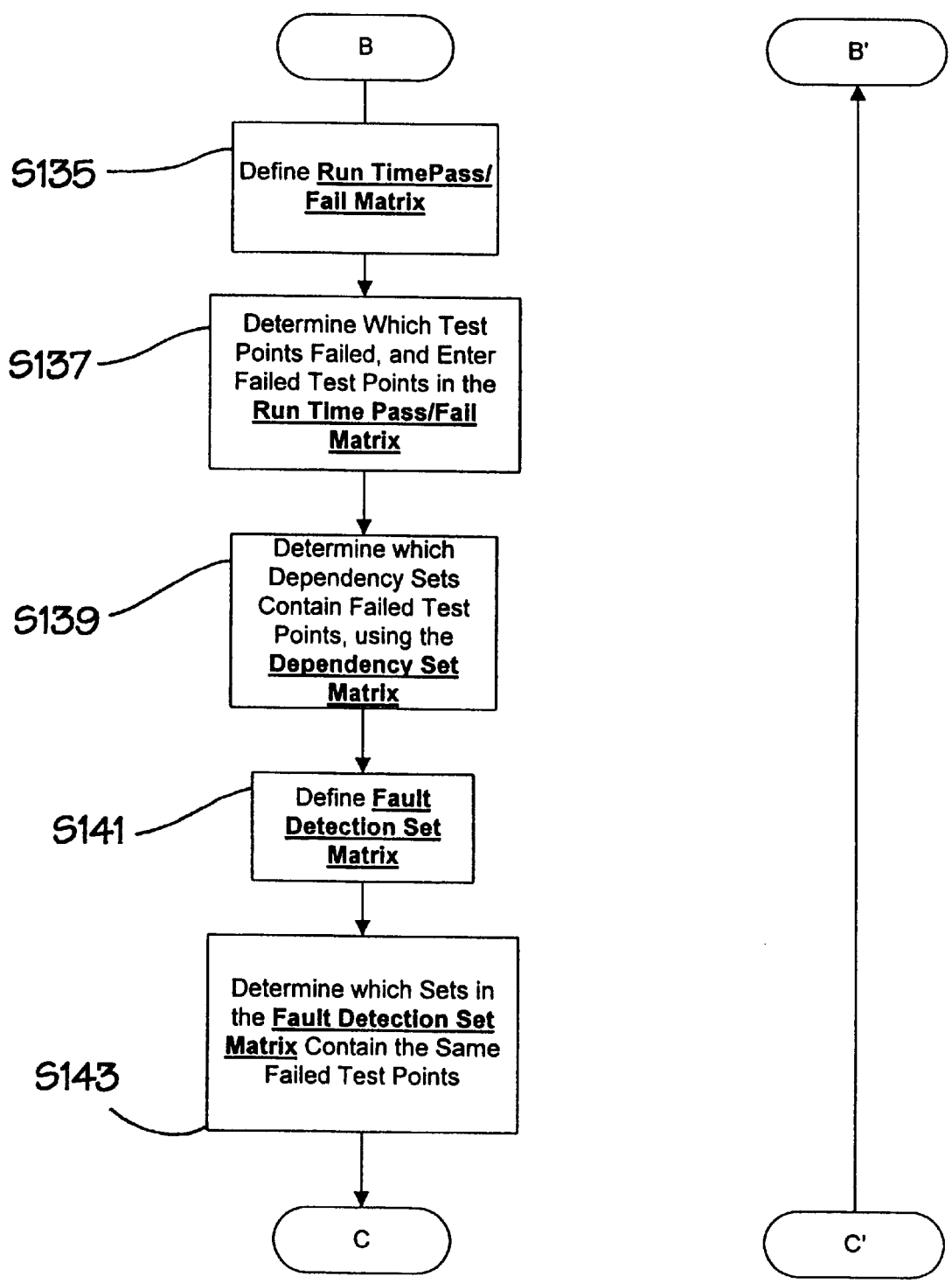
Figure 3D:
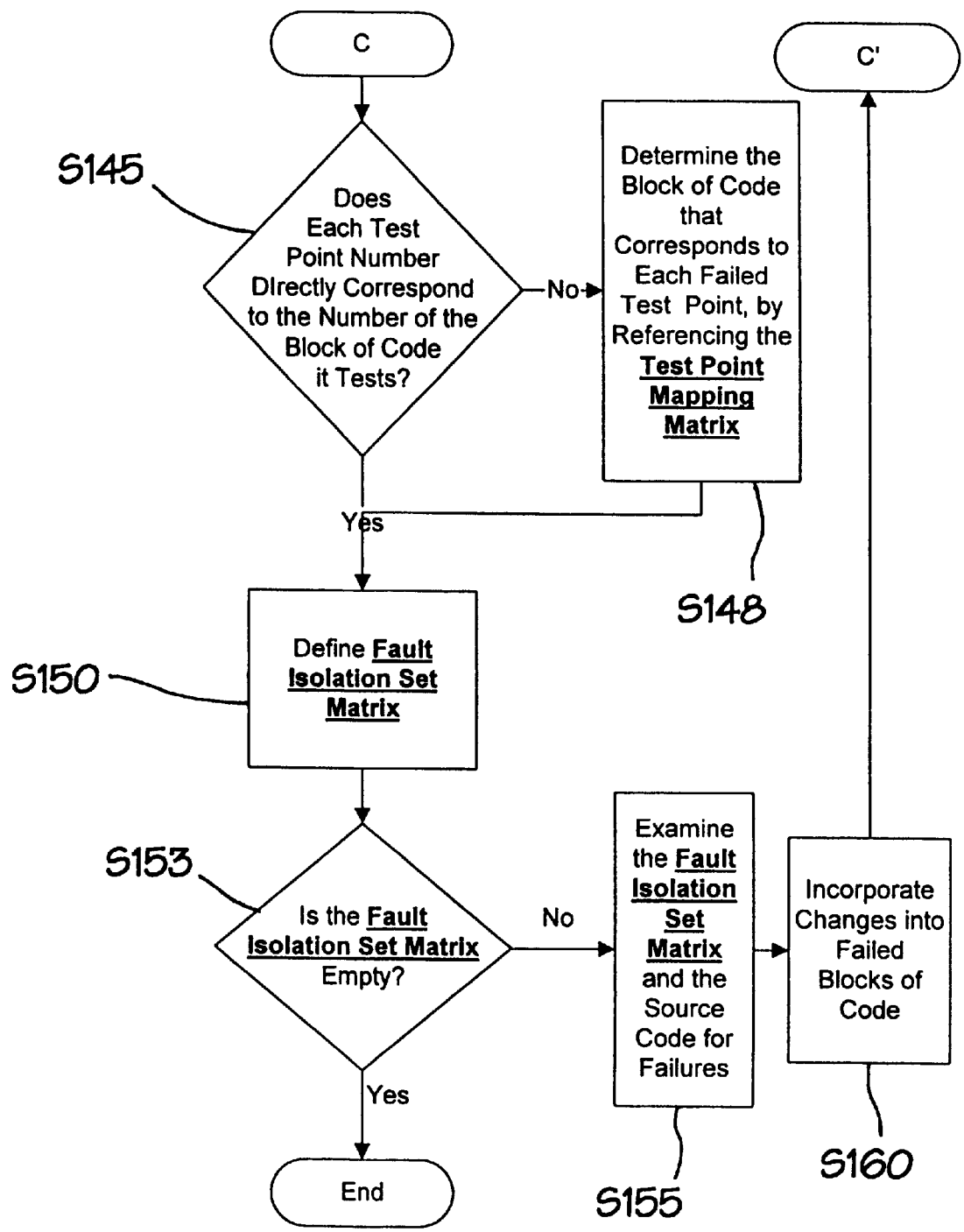

Turning to FIG. 2, the first block 40 outputs data to the third block 42 and, in turn, the third block 42 inputs data from the first block 40. Similarly, the third block 42 outputs data to the second block 44, and the second block 44 inputs data from the third block 42.

Test points are then written into the Fortran code. The test points are preferably placed at outputs of the various blocks of code, but may be placed elsewhere in alternative embodiments. In the present example, three test points are placed at the output of the third block 42. In particular, a first test point in the form of a statement "WRITE TESTDATA; 1, Yes" is placed before the RETURN statement in the subroutine to test whether the subroutine is ever executed, and a second test point in the form of a "WRITE TESTDATA; 2, A" command is placed after the first test point to test whether the subroutine passes the expected value back to the main program. A third test point in the form of a "WRITE TESTDATA; 3, 1.0" command of placed after the RETURN statement in the subroutine to test whether the value of "1.0" is being interpreted correctly during program execution. The test points are illustrated inserted into the program code below in Text Layout 3.

```
PROGRAM ABC
CALL NONO (1.0,X)           ]Designate as first block
PRINT*, '1 +', X, '=', 1.0 + X   ]Designate as second block
STOP
END
SUBROUTINE NONO(A,B)        |
B = 1.0                     |
A = 2.0                     |
WRITE TESTDATA; 1, Yes      |
WRITE TESTDATA; 2, A        |Designate as third block
RETURN                      
WRITE TESTDATA; 3, 1.0
END
                Text Layout 3.
```

After the interconnectivity among the various blocks of code has been established with a flow chart and test points have been incorporated into the code, the user identifies dependency sets among the various test points within the block diagram. Each dependency set represents a data propagation path through a number of test points. Since the flow chart of FIG. 2 only has three serial blocks, only one dependency set exists, which includes all three test points. As shown below in Text Layout 4, a single dependency set matrix is generated for the present example, comprising test points 1, 2 and 3.

| DEPENDENCY SET MATRIX | |
| --- | --- |
| Test Point Set | Set Includes Test Points |
| 1 | 1, 2 and 3 |
| Text Layout 4. | |

A test point mapping matrix is generated next, which maps each test point with the corresponding block of code that it is testing. In the present example, all three of the test points are designed to test the third block of code. The test point mapping matrix is provided below in Text Layout 5.

| TEST POINT MAPPING MATRIX | |
| --- | --- |
| Test Point | Block of Code |
| 1 | 3 |
| 2 | 3 |
| 3 | 3 |
| Text Layout 5. | |

In the presently preferred embodiment, after the user has established the flow chart, the placement of test points, the dependency set matrix, and the test point mapping matrix, the user selects a known "test" case and determines the values for the various test points. A hypothetical execution of the Fortran program of the present example for a standard case where desired results are achieved, would yield an output of "yes" for the first test point, an output of "2" for the second test point, and an output of "1.0" for the third test point. These three outputs represent what a user would expect from an execution of the Fortran code. The three outputs are shown in Text Layout 6 tabulated in a reference test point data file.

| REFERENCE TEST POINT DATA FILE | |
|---|---|
| Test Point | Reference Answer |
| 1 | Yes |
| 2 | 2 |
| 3 | 1.0 |
| Text Layout 6. | |

The user next executes the program, using inputs for the known test case. Upon execution of the program, the program writes output data to the run time test point data file at the three test points. The below Text Layout 7 illustrates that a value of "yes" is output by the program for the first test point, a value of "2" is output by the program for the second test point, and a value of "1.0" is output by the program for the third test point.

| RUN TIME TEST POINT DATA FILE | |
|---|---|
| Test Point | Reference Answer |
| 1 | Yes |
| 2 | 2 |
| 3 | 1.0 |
| Text Layout 7. | |

The method of the present invention, upon obtaining values for the run time test point data file, correlates the reference test point data file with the runtime test point data file, and creates the run time pass/fail matrix. If the run time result (output data) for the test point is as predicted by the reference test point data file, then the method of the present invention enters a pass status in the run time pass/fail matrix. If the run time result for the test point is different than that predicted by the reference test point data file, then the method of the present invention enters a fail status in the run time pass/fail matrix.

As indicated in Text Layout 8 below, since the output for the first test point is the same for both the expected result (as indicated in the reference test point data file) and the actual result (as indicated in the run time test point data file), the first test point is assigned a pass status. Since the output for the second test point is the same for both the expected result (as indicated in the reference test point data file) and the actual result (as indicated in the run time test point data file), the second test point is assigned a status of pass. The output value for the third test point in the run time test point data file is different than the output value for the third test point in the reference test point data file. Accordingly, the third test point is assigned a status of fail. In alternative embodiments, a fail status is only assigned to test points which have actual output values beyond a predetermined tolerance, relative to an output value in the reference test point data file for the test point.

| RUN TIME PASS/FAIL MATRIX | |
|---|---|
| Test Point | Pass/Fail |
| 1 | P |
| 2 | P |
| 3 | F |
| Text Layout 8. | |

The run time pass/fail matrix indicates which test points have failed. The mere occurrence of a test point failure, however, does not conclusively point to the source of the error in the program code.

In accordance with an important feature of the present invention, each failed test point is correlated with one or more dependency sets, to which the failed test point belongs. The method of the present invention references the dependency set matrix to determine the particular dependency sets that contain failed test points. The particular dependency sets that contain failed test points are assigned a fail status in a fault detection set matrix, as shown in Text Layout 9.

| FAULT DETECTION SET MATRIX | | |
|---|---|---|
| Fault Detection Set | Set Includes Test Points | Set Pass/Fail |
| 1 | 3, 2 and 1 | F |
| Text Layout 9. | | |

The method of the present invention searches the fault detection set matrix for failed dependency sets that contain the same test points, and creates the fault isolation set matrix. The fault isolation set matrix comprises a first column indicating the fault isolation set number, a second column indicating the test points included in the fault isolation set, and a third column indicating the block or blocks of code that contain the error. In the present example, as illustrated in Text Layout 10, a single fault isolation set includes the third test point.

Since the third test point is designed to test the third block of code, the third column of the fault isolation matrix should be able to indicate that an error in the code of the main program is present. Because the present example comprises a serial flow chart diagram, however, the method of the present invention cannot isolate to one of the three blocks of code if only the third block of code in the series fails. Here, the first test point passed indicating that the subroutine executed, and the second test point passed indicating that the subroutine passed the expected value back to the main program. Therefore, the present example indicates that a problem exists in the main program. Upon examination of the code by a user, a correction to the third block of code can be implemented.

| FAULT ISOLATION MATRIX | | |
|---|---|---|
| Fault Isolation Set | Set Includes Test Points | Code Block |
| 1 | 3 | 3 |

Text Layout 10.

The method of the presently preferred embodiment is depicted in the process diagrams of FIGS. 3a–3d. In accordance with the present invention, a method for automating and increasing the accuracy of software debugging, verification and validation is disclosed. In one presently preferred embodiment, the method employees logic and set-covering theory to matrix data. In contrast to typical prior-art devices, the method of the presently preferred embodiment does not rely on a user and a user's particular expertise during code execution and debug. The method of the presently preferred embodiment only needs to know the structure of the design and the test point results from a run of the program structure against a known problem.

The method of the presently preferred embodiment uses strategically placed test points within the code of the program that yield output data when the program is executed. This output data is used to deduce the location or locations of the most probable programming errors. Each test point comprises an intermediate output statement placed within the code to determine program execution status at a particular stage of execution of the program. The test points typically comprise data outputs or inputs to given software processes or functions. The method of the presently preferred embodiment uses the interdependency of various blocks of code to isolate the most probable failure of the code execution to one block or a group of blocks of code, depending on the number and placement of test points within the code.

The process of the presently preferred embodiment begins at step S100, and advances to step S102 where lines of code of the program to be tested are grouped into functional blocks. At step S104, the user identifies inputs and outputs for each individual block of code. The knowledge-based reasoning approach of the present invention uses the software design, which is preferably in the form of a flow chart, to build a functional model of the software code for identifying and isolating failures in the software code. From the flow chart, the method of the present invention derives the interconnectivity of inputs and outputs among the blocks of code.

At step S106, a run time test point data file is defined for later use. Output data from the test points will be written to the run time test point data file during execution of the program. In alternative embodiments, the run time test point data file may be defined immediately before use or at any other time before actual use thereof.

Test points are inserted into the code at step S108. Each test point instructs the program during execution to write output data to the run time test point data file. From a basic flow chart, a diagram can be generated which expresses the overall program into code blocks and interconnections of flow connectivity among the code blocks. The dependency of outputs on inputs for each code block provides a design knowledge-base, which allows for later analysis against a test case. In the presently preferred embodiment, for optimal overall results, at least one input and output are identified for each code block in the flow chart.

As presently preferred, a test point output statement is implanted into the code at each output of a code block, to provide for high testability of the design. The method of the present invention is capable of detecting multiple, simultaneously occurring code faults, provided that in adequate number of test points for the method to distinguish between fault propagation paths is provided within the code. If a user uses fewer test points, the method of the present invention will still function properly, but may not be able to isolate the fault to a single block of code. Even if a fewer number of test points is used, proper selection of the blocks of code (i.e. good fidelity of visibility into the design and fewer lines of code per block) may offset the absence of test points at every block of code output. One objective of the present invention is to isolate the fault to the smallest group of code so that the user may find and fix the problem faster.

The method of the present invention provides a structural-based modeling approach, as opposed to a functional approach, since the method of the present invention does not need to know the actual content or function of each block of code.

A block diagram or flow chart of the program is generated at step S110, if the flow chart has not already been previously established. The flow chart should show the interconnectivity among the various blocks of code, including information pertaining to the outputs which each block of code receives from other blocks of code as inputs. At step S113, dependency sets in the flow chart are identified. The dependency sets are placed into a dependency set matrix at step S116. Each dependency set defines a flow of data and/or program operation through a number of blocks of code. By definition, any block of code located "downstream" (later in execution), relative to another block of code, is dependent on the other block of code, if the downstream block of code receives and relies upon data from the upstream block of code. In accordance with the presently preferred embodiment, execution dependency of program code blocks is modeled using set theory. A dependency set contains as its contents test points that are interdependent. For example, a dependency set can be defined as all test points which are dependent on a particular block output.

At step S118, a standard or test case, where the correct results for each test point are available, is used to determine the expected values of the test points for an expected proper-operation execution of the software code. In the presently preferred embodiment, a user applies a known case and predicts what the test point outputs should be for a "no fault" case. The predicted testpoint output data, which is determined for each test point (from a known, correct solution) for the test case, is placed into a reference test point data file at step S120.

A test point mapping matrix is defined at Step S124 for later use. The test point mapping matrix may be used in the final analysis (step S148) to associate each test point with the block of code that it is testing. In alternative embodiments, the test point mapping matrix may be defined immediately before use or at any other time before actual use thereof.

A controlled execution for the known case of the computer code being analyzed is initiated at step S127. Upon execution of the program for the known case, the method of the present invention first writes data to the run time test point data file at step S129.

The method correlates the reference test point data file with the run time test point data file at step S131, to create the run time pass/fail matrix at step S135. Taking into account the operational mode of the software at the instant of data acquisition, a pass or a fail status is assigned for each test point during the program execution. This is achieved, for example, by evaluating the performance of state data from each test point, and by determining if that performance is within a predetermined acceptable tolerance for the specific operational mode. If the runtime result, written during execution of the program by a given test point, is as predicted by the reference test point data file, the method of the present invention enters a pass status into the run time pass/fail matrix. If the runtime result is not as predicted by the reference test point data file, the method of the present invention enters a fail status into the run time pass/fail matrix. At step S137, the method determines whether each given test point has a pass or a fail status, and enters the appropriate value into the run time pass/fail matrix.

By monitoring the data from each test point in real-time during execution of the program code, the performance of the program code can be evaluated. The data originating from the test points in real-time is compared with the results from the known test case. In steps S139 to S160, discussed below, the process of the present invention is able to fault isolate the incorrect result or results to the specific block or blocks of the flow chart, to thereby fault isolate to the specific group of lines or line of code which is incorrect. Since all data and the functional model are preferably located on a computer, the process of the present invention is completely automated in one embodiment, to increase the accuracy and decrease the time required to isolate a software failure.

Having acquired the run time pass/fail matrix from step S137, the method of the present invention now has information regarding the test points in the program code that have failed. At step S139 the method of the present invention sets out to determine all of the dependency sets that contain failed test points. Each test point with a fail status is correlated to the dependency set or sets which contain the failed-status test point, to enable a determination as to which dependency sets contain failures. The method collects all of the dependency sets (from the dependency set matrix) that contain failed-status test points, as indicated by the run time pass/fail matrix. At step S141 the method of the present invention defines the fault detection set matrix and places all dependency sets that contain failed-status test points therein.

As presently embodied, the method uses set covering theory and associated logic to correlate fault dependency among several matrices containing the necessary data to isolate the fault or faults to one or more blocks of code. In accordance with a preferred embodiment of the present invention, test point commonality among the dependency sets, which are known to contain test point failures, provides one effective means of fault isolation. In the presently preferred embodiment, the contents of the fault detection set matrix are scanned to determine test point commonality and to ultimately produce the fault isolation set matrix, which is the output of the method of the present invention.

In step 143, the method searches the fault detection set matrix for sets that contain the same failed test points. The method of the present invention determines whether the number of test points directly corresponds to the number of blocks of code at step S145. If the number of test points directly corresponds to the number of blocks of code, and if the number of each test point directly corresponds to the number of the block of code it tests, then program operation branches down to step S150.

In step S150, the fault isolation set matrix is defined. As presently embodied, the fault isolation set matrix contains three columns. In particular, the fault isolation set matrix comprises a first column indicating the fault isolation set number, a second column indicating the test points included in the fault isolation set, and a third column indicating the block or blocks of code that contain the error. Each row in the fault isolation set matrix represents a source of failure. When program operation branches directly to step S150, the number of the test point that failed will be the same as the number of the block of code containing the error. That is, columns two and three will have the same content in the fault isolation set matrix.

If, on the on the other hand, the number of test points does not directly correspond to the number of blocks of code, and if the number of each test point does not directly correspond to the number of the block of code which it tests, then program operation branches over to step S148. For example, if the user has assigned more test points than blocks of code, as might be the case when one or more blocks of code have multiple outputs, the method references the test point mapping matrix to determine which block of code each test point is associated. Subsequently, the fault isolation matrix, including column three thereof, is populated at step S150.

At step S153, the method of the present invention inspects the fault isolation set matrix to determine whether any entries exist therein. If the fault isolation set matrix is empty, then the method ends.

If, on the other hand, one or more entries exist in the fault isolation set matrix, the program operation branches to step S155. The fault isolation set matrix and the code are examined for errors in step S155, and any changes are incorporated into the failed blocks of code at step S160. The process branches back to step S102 and the process repeats, until the fault isolation set matrix is empty at the inspection step S153, indicating a successful program execution with no code failures.

In a simple embodiment of the present invention, all steps except for step S127 and S129 can be performed manually. In another embodiment, all steps except for steps S127 to S153 are performed manually. In still other embodiments, steps S102 to S160 are all automatically performed on a computer.

Figure 4:
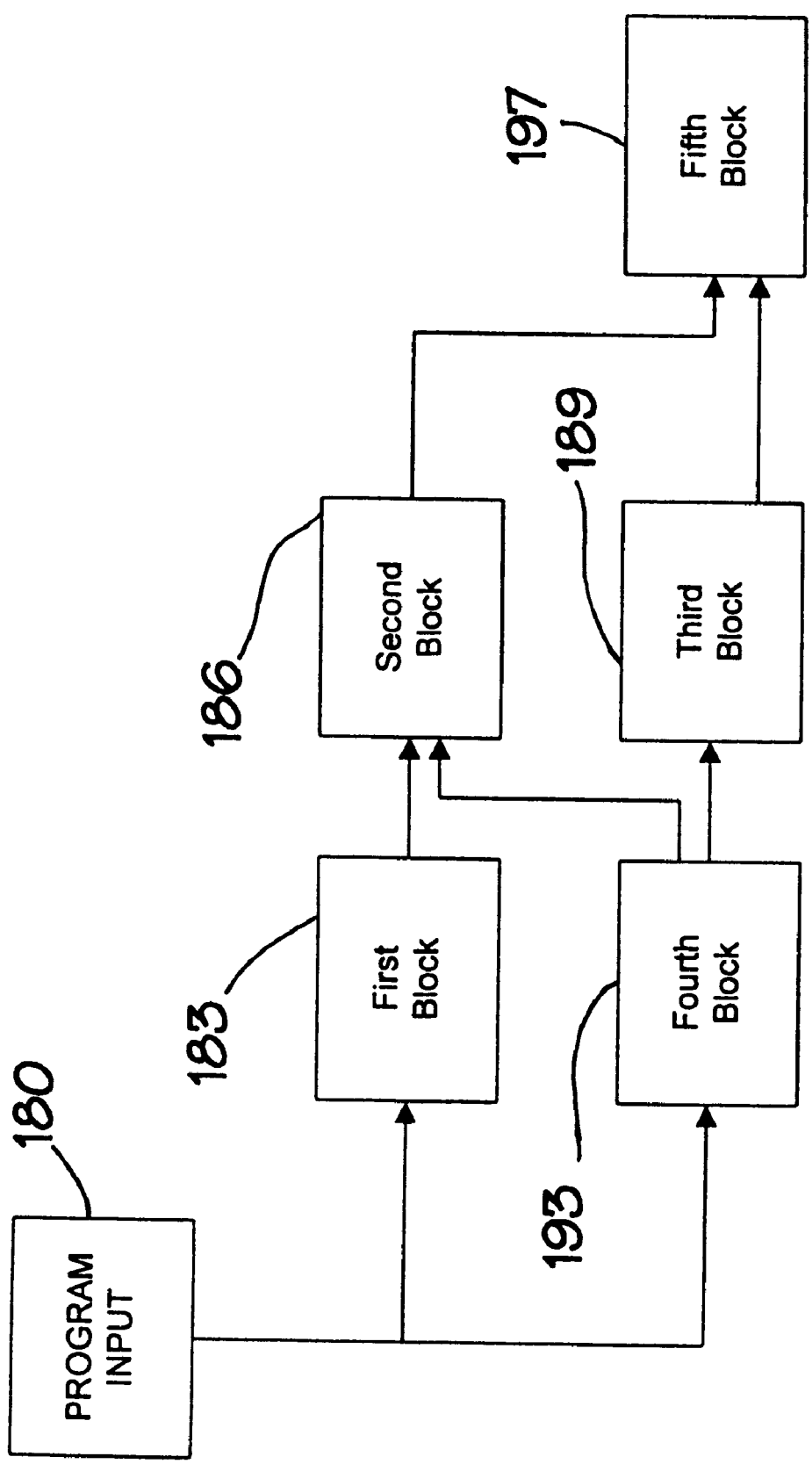
FIG. 4 is a flow chart illustrating the interconnectivity and process flow among a number of blocks of code of a second example computer program in accordance with the present invention.

Turning now to FIG. 4, the method of the presently preferred embodiment is discussed with continued reference to FIGS. 3a–3d. The method of the present invention first groups the lines of code of a program into functional blocks of code (step S102), and the inputs and outputs of each of the functional blocks of code are identified (step S104). The flow chart or functional block diagram representation of the program is generated to achieve this end, as illustrated in FIG. 4. The flow chart defines the processing flow through the various blocks of code, defines inputs and outputs of the various blocks of code, and also defines the data interconnections between the various blocks of code.

The processing flow in the functional block diagram of FIG. 4 branches from a program input 180 to a first block 183. The processing flow in the functional block diagram passes from the first block 183 to the second block 186 and, subsequently, passes from the second block 186 to the fifth block 197. In addition to branching to the first block 183, the processing flow from the program input 180 also branches to the fourth block 193. Processing flow in the functional block diagram passes from the fourth block 193 to both the second block 186 and the third block 189 and, subsequently, passes from the third block 189 to the fifth block 197.

The run time test point data file can be defined at this point or later (step S106), and test points are incorporated into the program code (step S108) to write output data into the run time test point data file. The test points are preferably placed at outputs of the various blocks of code, but may be placed elsewhere in alternative, but not equivalent, embodiments.

After the interconnectivity among the various blocks of code has been established with a flow chart (step S110) and test points have been incorporated into the code, dependency sets among the various test points within the block diagram are identified (step S113), and the identified dependency sets are placed into a dependency set matrix (step S116). Each dependency set represents a data propagation path through a number of test points. As shown below in Text Layout 11, six dependency set matrices are generated for the present example.

DEPENDENCY SET MATRIX

| Test Point Set | Set Includes Test Points |
| --- | --- |
| 1 | 5, 2 and 1 |
| 2 | 5, 2 and 4 |
| 3 | 5, 3 and 4 |
| 4 | 2 and 1 |
| 5 | 3 and 4 |
| 6 | 2 and 4 |

Text Layout 11.

Each dependency set includes a different group of all test points that are dependent upon one another. For example, one dependency set includes all test points associated with the fifth block 197, the second block 186 and the first block 183. Another dependency set includes all test points associated with the fifth block 197, the third block 189 and the fourth block 193.

After the flow chart, the placement of test points, and the dependency set matrix are all established, a known "test" case is selected where the values for the various test points are available or can be determined. The reference test point data file is established (steps S118 and S120), and the values for the various test points are entered therein.

Each test point is mapped with the corresponding block of code that it is testing (step S122), and a test point mapping matrix is generated (step S124), The test point mapping matrix is provided below in Text Layout 12.

TEST POINT MAPPING MATRIX

| Test Point | Block of Code |
| --- | --- |
| 1 | 1 |
| 2 | 2 |
| 3 | 3 |
| 4 | 4 |
| 5 | 5 |

Text Layout 12.

The program is then executed, using inputs for the known test case (step S127). During execution of the program, the program writes output data from the test points to the run time test point data file (step S129). The method of the present invention, upon obtaining values for the run time test point data file, correlates the reference test point data file with the runtime test point data file (step S131), and creates the run time pass/fail matrix (step S135). If the run time result (output data) for the test point is as predicted by the reference test point data file, then the method of the present invention enters a pass status into the run time pass/fail matrix. If the run time result for the test point is different than that predicted by the reference test point data file, then the method of the present invention enters a fail status into the run time pass/fail matrix (step S137).

As indicated in Text Layout 13 below, since the output for the first test point is the same for both the expected result (as indicated in the reference test point data file) and the actual result (as indicated in the run time test point data file), the first test point is assigned a pass status. Since the output for the second test point is different than both the expected result (as indicated in the reference test point data file) and the actual result (as indicated in the run time test point data file), the second test point is assigned a fail status. As another example, since the output value for the third test point in the run time test point data file is the same as the output value for the third test point in the reference test point data file, the third test point is assigned a status of pass. In alternative embodiments, a fail status is only assigned to test points which have actual output values beyond a predetermined tolerance, relative to an output value in the reference test point data file for the test point. The run time pass/fail matrix for the present example is provided below for all five test points.

RUN TIME PASS/FAIL MATRIX

| Test Point | Pass/Fail |
| --- | --- |
| 1 | P |
| 2 | F |
| 3 | P |
| 4 | P |
| 5 | F |

Text Layout 13.

The run time pass/fail matrix indicates which test points have failed. The mere occurrence of a test point failure, however, does not conclusively point to the source of the error in the program code. In accordance with the present invention, the mere process of fault detection is carried an additional step to fault isolation. Fault detection is simply the knowledge that a fault has occurred, without the additional knowledge of where or how the fault has occurred. Fault isolation, in accordance with the present invention, is the additional process by which the source of location of the fault is determined. The method of the present invention first detects a fault or faults, and then isolates the fault or faults to a section of code. The lowest possible section of code, in accordance with the presently preferred embodiment, is a block of code.

In accordance with an important feature of the present invention, each failed test point is correlated with one or more dependency sets to which the failed test point belongs. The method can now deduce, for example, "if test point 5 failed and it was dependent upon test point 3 and 2, but test point 3 passed and test point 2 failed then test point 5 failed due to either itself or test point 2 failing," and "if test point 2's only dependency was on test points 1 and 4 and both of them passed, then the fault must have occurred in a block of code which has its output connected to test point 2."

By processing the fault deduction logic "did this dependency set contain a test point failure?" on all dependency sets in the dependency set matrix in successive progression from larger sets to smaller sets and then comparing which sets have failures, the method converges on a solution that shows the smallest fault isolation set. More particularly, the method of the presently preferred embodiment references the dependency set matrix to determine the particular dependency sets that contain failed test points. The particular dependency sets that contain failed test points are assigned a fail status in a fault detection set matrix (step S141), as shown in Text Layout 14.

| FAULT DETECTION SET MATRIX | | |
| --- | --- | --- |
| Fault Detection Set | Set Includes Test Points | Set Pass/Fail |
| 1 | 5, 2 and 1 | F |
| 2 | 5, 2 and 4 | F |
| 3 | 5, 3 and 4 | F |
| 4 | 2 and 1 | F |
| 5 | 3 and 4 | F |
| 6 | 2 and 4 | F |

The method of the present invention searches the fault detection set matrix for failed dependency sets that contain the same test points (step S143), and creates the fault isolation set matrix (step S150). The fault isolation set matrix comprises a first column indicating the fault isolation set number, a second column indicating the test points included in the fault isolation set, and a third column indicating the block or blocks of code that contain the error. The fault isolation matrix is provided in Text Layout 15.

| FAULT ISOLATION MATRIX | | |
| --- | --- | --- |
| Fault Isolation Set | Set Includes Test Points | Code Block |
| 1 | 2 | 2 |

Text Layout 15.

The result in this example shows that the method was able to isolate the fault to a cause in one block of code which had its output tested by test point 2. The method, when applied to large programs that do not have intuitive, easy to understand flow diagrams, can provide a powerful analytical tool. The method, which can quickly analyze a program in its entirety from a single execution of the program and yield fault isolation results on individual blocks of code, presents new and useful utility, as compared to conventional methods which sequentially examine code in a time-consuming fashion.

In the present example, test point 2 is found to be a conclusive fault. Test point 5, on the other hand, does have a failed status but has not been found to necessarily be a conclusive error. The method of the presently preferred embodiment, as applied to the present example, cannot determine with certainty whether test point 5 is a conclusive failure or whether the failure of test point 5 is a propagated failure from test point 2. In one embodiment of the present invention, a masked fault isolation matrix can be generated as an output, comprising test points which have been determined to be faults but which have not been determined to be conclusive faults. The masked fault isolation matrix for the present example is provided below in Text Layout 16.

| MASKED FAULT ISOLATION MATRIX | | |
| --- | --- | --- |
| Masked Fault Set | Set Includes Test Points | Code Block |
| 1 | 5 | 5 |

Text Layout 16.

Figure 5:
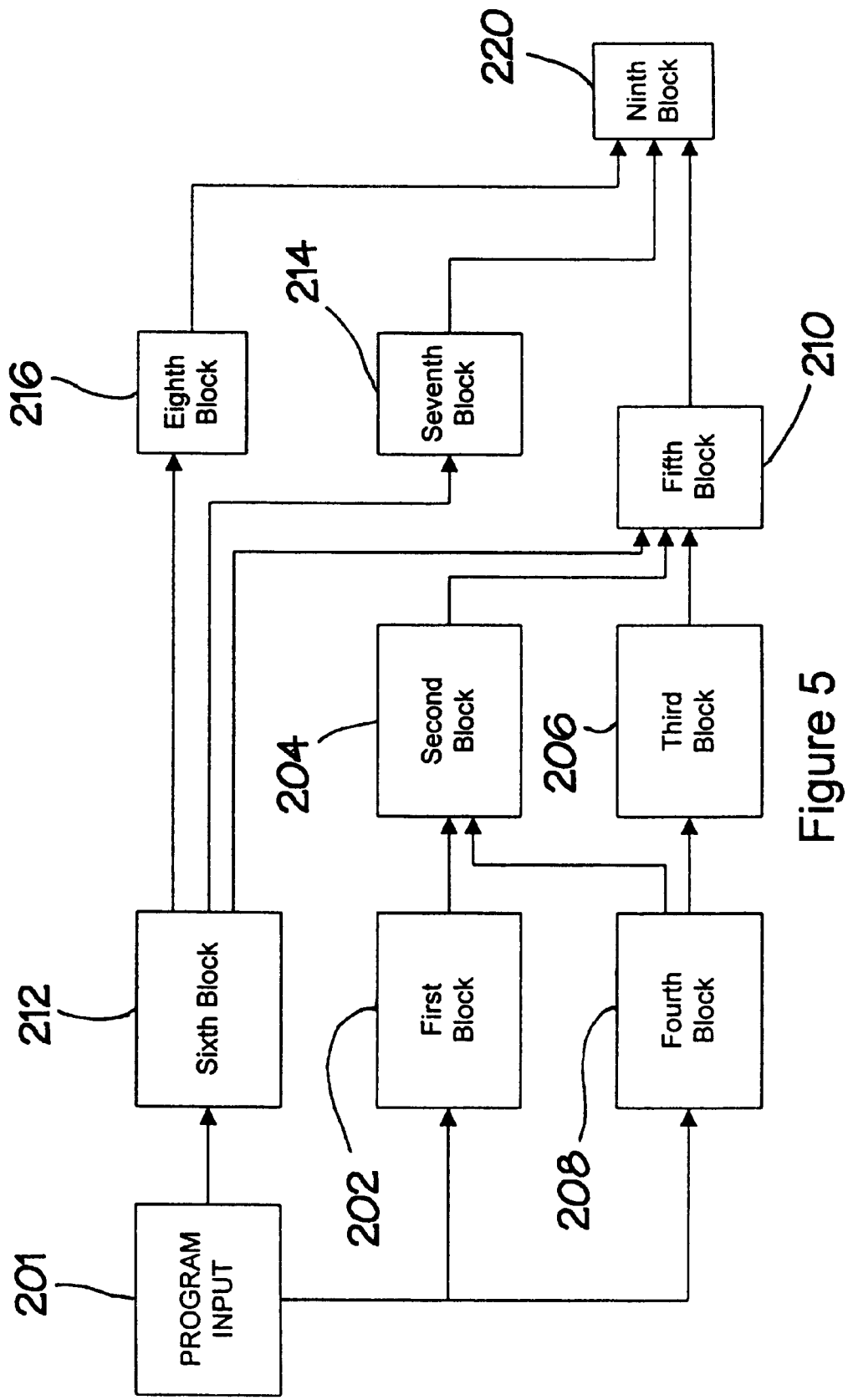
FIG. 5 is a flow chart illustrating the interconnectivity and process flow among a number of blocks of code of a third example computer program in accordance with the present invention.
Figure 6:
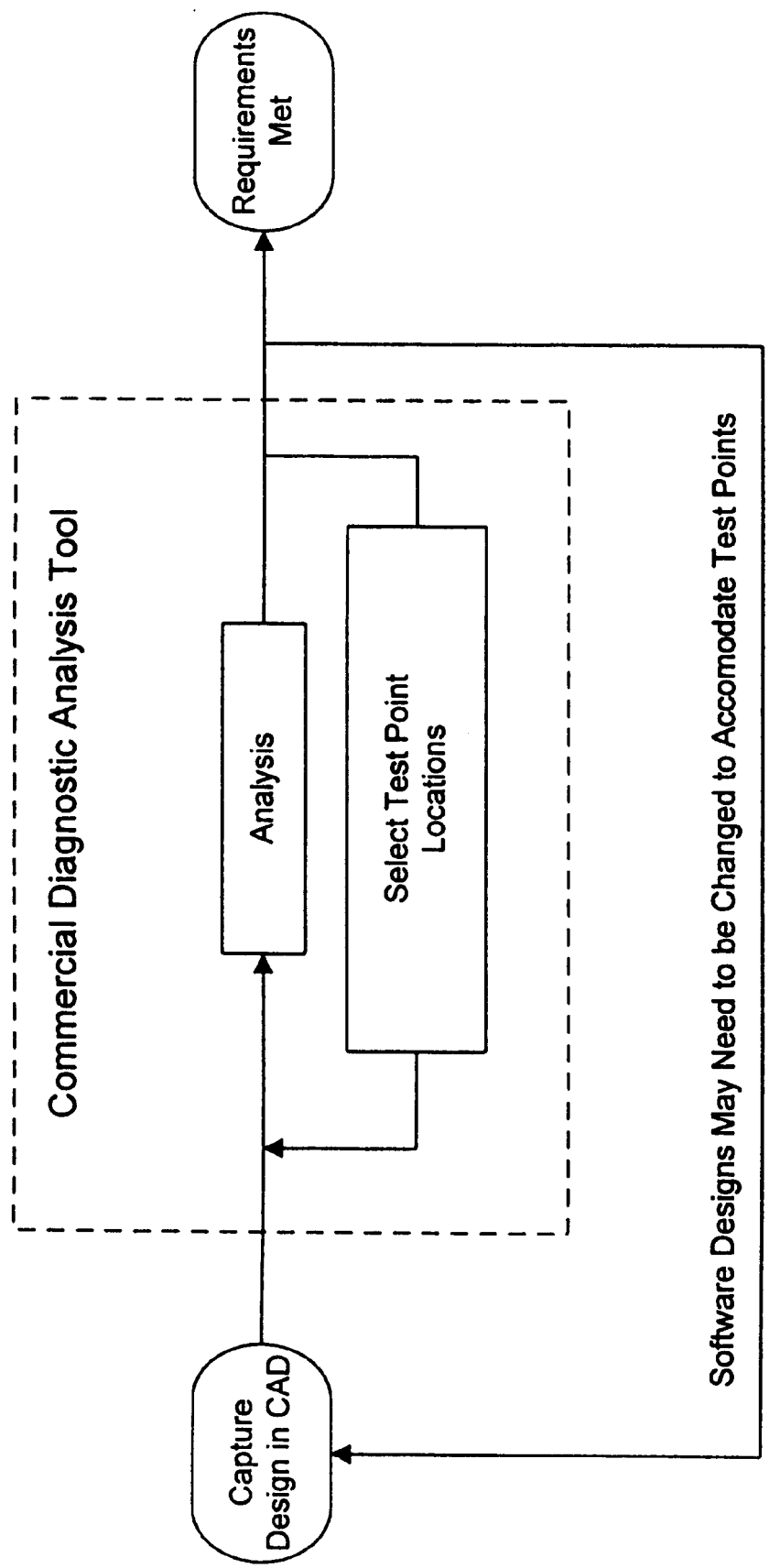
FIGS. 6–9 comprise flow charts illustrating a method in accordance with an alternative embodiment of the present invention.
Figure 7:
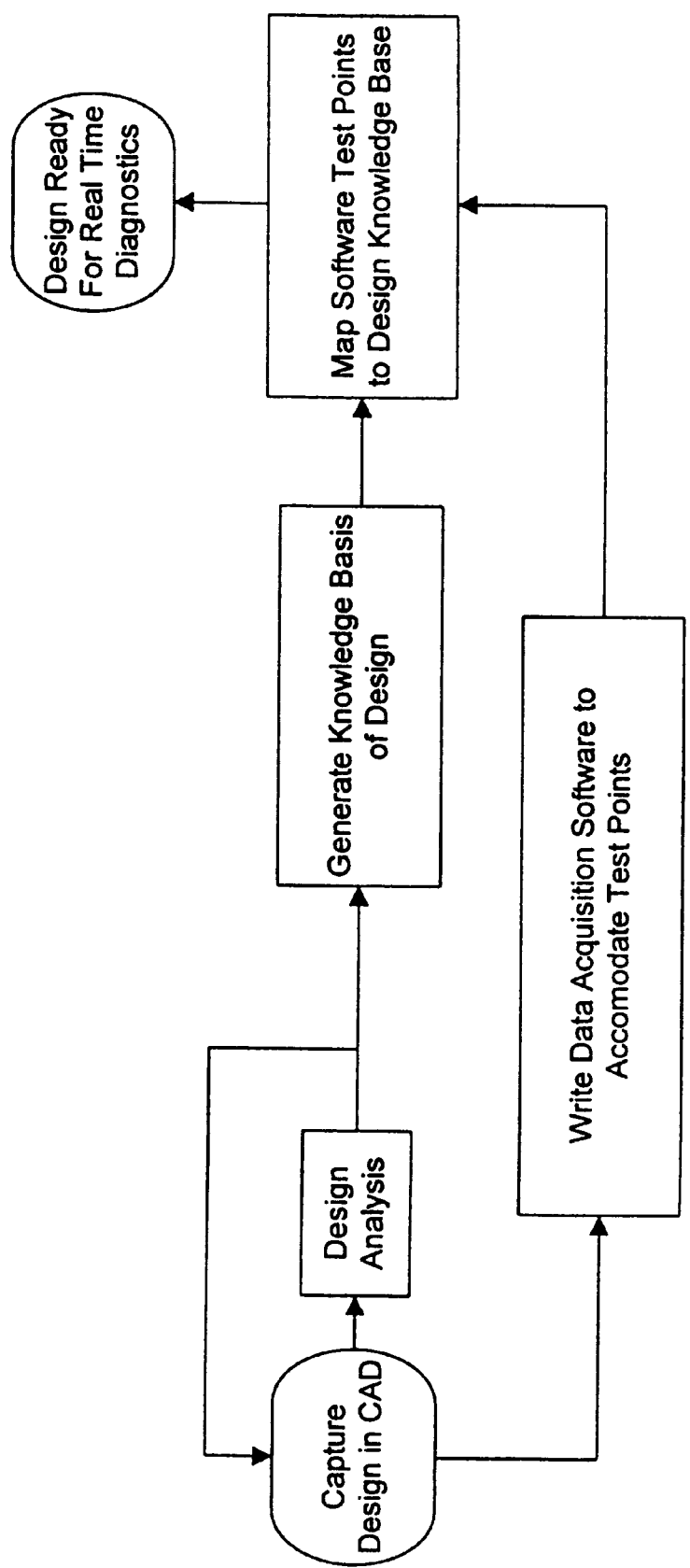
Figure 8:
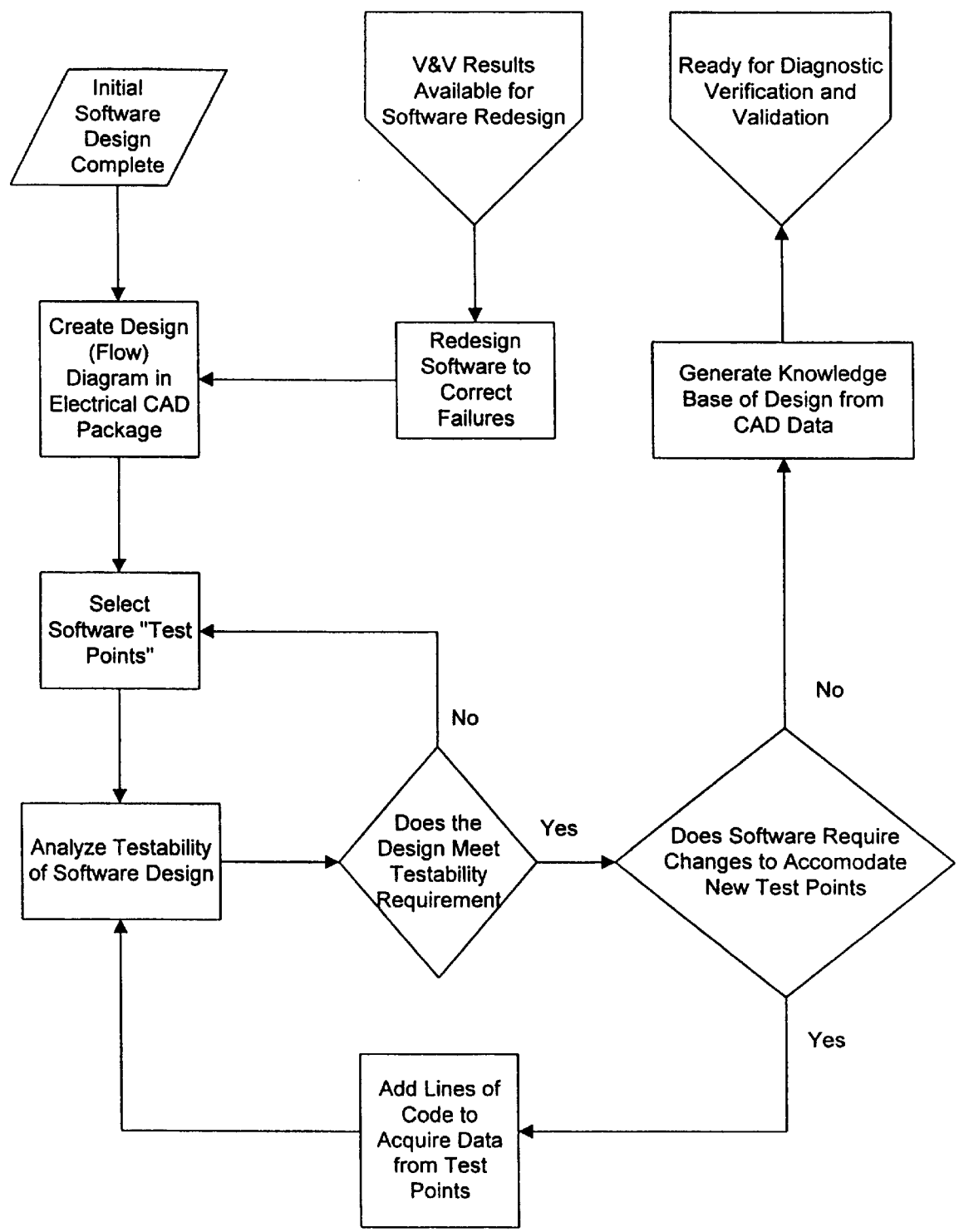
Figure 9:
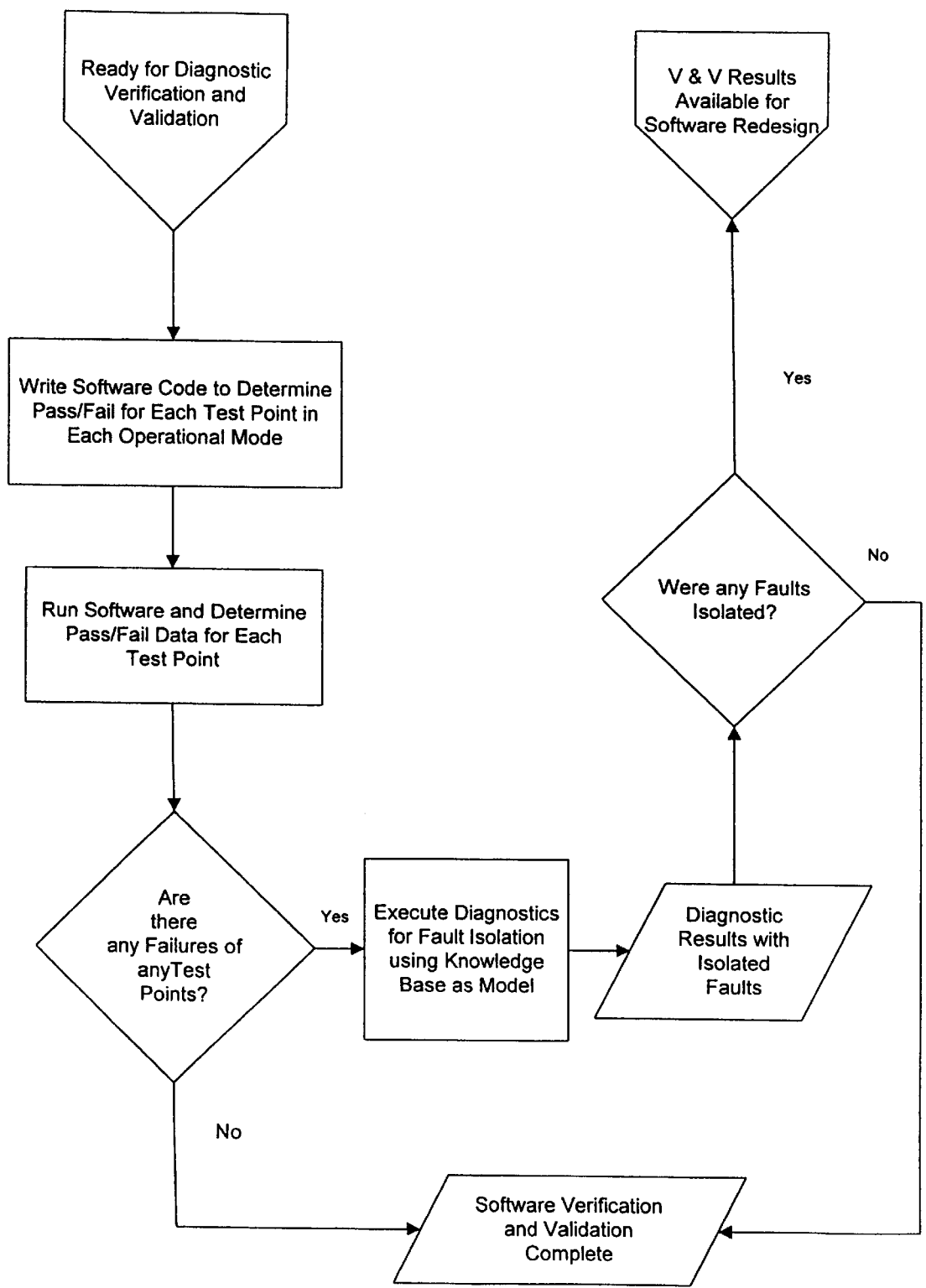

Turning now to FIG. 5, the method of the presently preferred embodiment is discussed as applied to another example, with reference again to FIGS. 3a–3d. The method groups the lines of code of a program into functional blocks of code (step S102), and the inputs and outputs of each of the functional blocks of code are identified (step S104). The flow chart of FIG. 5 is generated to achieve this end. As with the example of FIG. 4, the flow chart of FIG. 5 defines the processing flow through the various blocks of code, defines inputs and outputs of the various blocks of code, and also defines the data interconnections between the various blocks of code.

The processing flow in the functional block diagram of FIG. 5 branches from a program input 201 to a first block 202. The processing flow in the functional block diagram passes from the first block 202 to the second block 204 and, subsequently, passes from the second block 204 to the fifth block 210. The processing flow finally moves from the fifth block 210 to the ninth block 220. In addition to branching to the first block 202, the processing flow from the program input 201 also branches to the fourth block 208. Processing flow in the functional block diagram passes from the fourth block 208 to both the second block 204 and the third block 206 and, subsequently, passes from the third block 206 to the fifth block 210. The processing flow from the program input 201 further branches to the sixth block 212 and, subsequently, branches to both the seventh block 214 and to the eight block 216. Processing flow from the eight block 216 and from the seventh block 214 converges onto the ninth block 220.

In accordance with the method of the present invention, the run time test point data file is next defined (step S106), and test points are incorporated into the program code (step S108) to write output data into the run time test point data file. The test points are preferably placed at outputs of the various blocks of code, but may be placed elsewhere, as well.

The interconnectivity among the various blocks of code is established with a flow chart (step S110) and test points are incorporated into the code. Dependency sets among the various test points within the block diagram are identified (step S113), and the identified dependency sets are placed into a dependency set matrix (step S116). Each dependency set represents a data propagation path through a number of test points. As shown below in Text Layout 17, 14 dependency set matrices are generated for the present example.

| DEPENDENCY SET MATRIX | |
| --- | --- |
| Test Point Set | Set Includes Test Points |
| 1 | 5, 2 and 1 |
| 2 | 5, 2 and 4 |
| 3 | 5, 3 and 4 |
| 4 | 2 and 1 |

DEPENDENCY SET MATRIX

| Test Point Set | Set Includes Test Points |
|---|---|
| 5 | 3 and 4 |
| 6 | 2 and 4 |
| 7 | 5 and 6 |
| 8 | 7 and 6 |
| 9 | 9, 7 and 6 |
| 10 | 9, 5 and 6 |
| 11 | 9, 5, 3 and 4 |
| 12 | 9, 5, 2 and 1 |
| 13 | 9, 5, 2 and 4 |
| 14 | 9, 8 and 6 |

Text Layout 17.

A known "test" case is next selected where the values for the various test points are available or can be determined. The reference test point data file is established (step S120), and the values for the various test points are entered therein. Each test point is mapped with the corresponding block of code that it is testing (step S122), and a a test point mapping matrix is generated (step S124). The test point mapping matrix is provided below in Text Layout 18.

TEST POINT MAPPING MATRIX

| Test Point | Block of Code |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |

Text Layout 18.

Execution of the program is next implemented, in which inputs for the known test case are used (step S127). During execution of the program, the program writes output data from the test points to the run time test point data file (step S129). The method of the present invention, upon obtaining values for the run time test point data file, correlates the reference test point data file with the runtime test point data file (step S131), and creates the run time pass/fail matrix (step S135). If the run time result (output data) for the test point is as predicted by the reference test point data file, then the method of the present invention enters a pass status in the run time pass/fail matrix. If the run time result for the test point is different than that predicted by the reference test point data file, then the method of the present invention enters a fail status in the run time pass/fail matrix (step S137). The run time pass/fail matrix for the present example is provided below for all nine test points.

RUN TIME PASS/FAIL MATRIX

| Test Point | Pass/Fail |
|---|---|
| 1 | P |
| 2 | F |
| 3 | P |
| 4 | P |
| 5 | F |
| 6 | P |
| 7 | P |
| 8 | F |
| 9 | F |

Text Layout 19.

The run time pass/fail matrix indicates which test points have failed, but does not conclusively point to the source of the error in the program code. Each failed test point is correlated with one or more dependency sets to which the failed test point belongs. The method of the present invention references the dependency set matrix to determine the particular dependency sets that contain failed test points. The particular dependency sets that contain failed test points are assigned a fail status in a fault detection set matrix (step S141), which is shown in Text Layout 20.

FAULT DETECTION SET MATRIX

| Fault Detection Set | Set Includes Test Points | Set Pass/Fail |
|---|---|---|
| 1 | 5, 2 and 1 | F |
| 2 | 5, 2 and 4 | F |
| 3 | 5, 3 and 4 | F |
| 4 | 2 and 1 | F |
| 5 | 3 and 4 | P |
| 6 | 2 and 4 | F |
| 7 | 5 and 6 | F |
| 8 | 7 and 6 | P |
| 9 | 9, 7 and 6 | F |
| 10 | 9, 5 and 6 | F |
| 11 | 9, 5, 3 and 4 | F |
| 12 | 9, 5, 2 and 1 | F |
| 13 | 9, 5, 2 and 4 | F |
| 14 | 9, 8 and 6 | F |

Text Layout 20.

The method of the present invention searches the fault detection set matrix for failed dependency sets that contain the same test points (step S143), and creates the fault isolation set matrix (step S150). The fault isolation matrix is provided in Text Layout 21.

FAULT ISOLATION MATRIX

| Fault Isolation Set | Set Includes Test Points | Code Block |
|---|---|---|
| 1 | 2 | 2 |
| 2 | 8 | 8 |

Text Layout 21.

In the present example, test points 2 and 8 are found to be conclusive faults. Test points 5 and 8, on the other hand, have failed status but are not found to necessarily be conclusive errors. The method of the presently preferred embodiment, as applied to the present example, cannot determine with certainty whether test points 5 and 9 are conclusive failures or whether the failures of test point 5 and 9 are propagated from test points 2 and 8, respectively. In an embodiment where a masked fault isolation matrix is generated as an output, test points 5 and 9 are output in the masked fault isolation matrix as non-conclusive faults. The masked fault isolation matrix for the present example is set forth in Text Layout 22.

MASKED FAULT ISOLATION MATRIX

| Masked Fault Set | Set Includes Test Points | Code Block |
|---|---|---|
| 1 | 5 | 5 |
| 2 | 9 | 9 |

Text Layout 22.

A key advantage associated with the method of the present invention is a reduction in the amount of time and cost typically required in implementing software debugging, verification and validation. Because the program code is modeled with a knowledge-based reasoning approach, which is derived from the software design itself, prior-art requirements of spending great effort in evaluating each line of code in connection with algorithm studies, code inspections and independent code analysis is substantially attenuated. The reduction in time and cost is achieved through the modeling of the actual functionality of the code.

In an embodiment where a high-level of automation is implemented into the method of the present invention, a real-time fault detection and isolation algorithm is used in conjunction with the functional model of the software to perform diagnostics during the execution of the software code. Real-time fault detection tools are presently commercially available for hardware verification and validation application. These real-time fault detection tools for hardware can be adapted to and applied to software code debugging, verification and validation procedures in accordance with the present invention.

Since the method of the present invention comprises a structural modeling approach, rather than functional, the method can be incorporated into commercially available Hardware Definition Languages, for example, such as Very High Scale Integrated Circuit Hardware Definition Language (VHDL), which is a common digital microcircuit design and simulation language. The incorporation of VHDL into the method, in accordance with one embodiment of the present invention, can allow for simultaneous modeling of hardware, firmware and embedded software.

The method of the present invention can be extended to include a class of software design and/or drawing tools, which are adapted to create and/or accept block diagrams drawn on a Personal Computer (PC) display by a user, and which are adapted to "capture" the design. An extension of the method of the present invention encompasses a software application, for example, which is adapted to receive a block diagram, drawn on a PC by a user, and to automatically convert the block diagram into a dependency set matrix. The drawing software application, in one embodiment, is adapted to save the file in a format that delineates the connectivity between blocks and the respective inputs and outputs and locations of test points. A high level drawing tool, which is adapted to facilitate automatic building of the dependency set matrix, can save additional time and can extend the utility of the present invention to very large programs.

In accordance with one embodiment of the present invention, once a block diagram representation of the software design is complete, the block diagram is captured within a Computer Aided Design (CAD) package and formatted into either Electronic Data Interchange Format (EDIF) or VHDL format, for example. Both EDIF and VHDL are electrical design industry standard descriptive languages. Both EDIF and VHDL provide formats that can be used with a wide variety of tools. Although an electrical CAD package is presently preferred for capturing the software block diagram (flow chart), other specific design packages can be made to save the design in EDIF or VHDL formats through the use of data file translators.

As presently embodied, the EDIF and VHDL files contain all of the descriptive detail necessary to document and model most any computer software design under evaluation. Commercially available electronic industry tools can be used with the basic EDIF or VHDL file to perform diagnostic analysis and to identify, for example, the testability of the software design. When implementing such commercially available electronic industry tools, the setup and application of software test points generally very closely corresponds to the setup and application of hardware test points.

The commercially available electronic industry tools can be configured, in accordance with the present invention, to perform the software analysis in a similar way to that of the conventionally-implemented hardware analysis. Two examples of these analytical tools, which accept EDIF formatted input files, are the McDonnell Douglas tool called AUTOTEST and the U.S. Army TMDE tool called the Diagnostic Analysis and Repair Tool Set (DARTS).

The selection of the software test points, in accordance with the present invention, can be performed during the diagnostic analysis of the program code using an EDIF or VHDL based analytical tool, such as AUTOTEST or DARTS. These commercially available tools can help the design engineer select test points which will enhance the testability of the software design, thereby improving the fault detection and isolation statistics of the present invention. Both the AUTOTEST and DARTS tools are used to document and improve the testability of electronic designs. The process diagrams shown in FIGS. 6–10 are compatible with the above-mentioned commercially available diagnostic tools.

After a pass or a fail status is assigned to each test point during the program execution, a resulting test point data file is processed by a search algorithm which uses the knowledge base (functional model) of the software design as a reference. In this embodiment, a dependency comparison of pass/fail test point data is performed which enables a search to be conducted to eliminate possible failure locations. For example, the system would conclude that a block in the design diagram (flow chart) must be functioning properly if its inputs are pass and its outputs are pass. By mapping the effects of pass and fail data against the functional model of the software code, the process of the present invention can isolate to the list of possible failures for a given test point data file. Since a dependency relationship is naturally defined within the software flow chart interconnections, it is not necessary that every data point in the system diagram be instrumented.

It is noted that the process exemplified in steps S129 to S153 (FIGS. 3b–3d), for example, are not intended to be limiting and may be implemented in other ways or with other means other than the computer system 20 of FIG. 1. An important aspect of the inventive process is that a pass/fail test point data file for the software code being tested is generated, and that the test point data file is analyzed using a knowledge-based reasoning approach, which preferably comprises a functional model of the software code.

The knowledge-based reasoning approach for software debugging, verification and validation, in accordance with the present invention, may be used beyond the development, performance monitoring, diagnostics, and testing phases of the software product. The process of the present invention can provide a foundation for performance monitoring during operation throughout the life cycle of a software module, thereby enabling users to verify the operation of the software at any time during the operational life of the software product.

Figure 10:
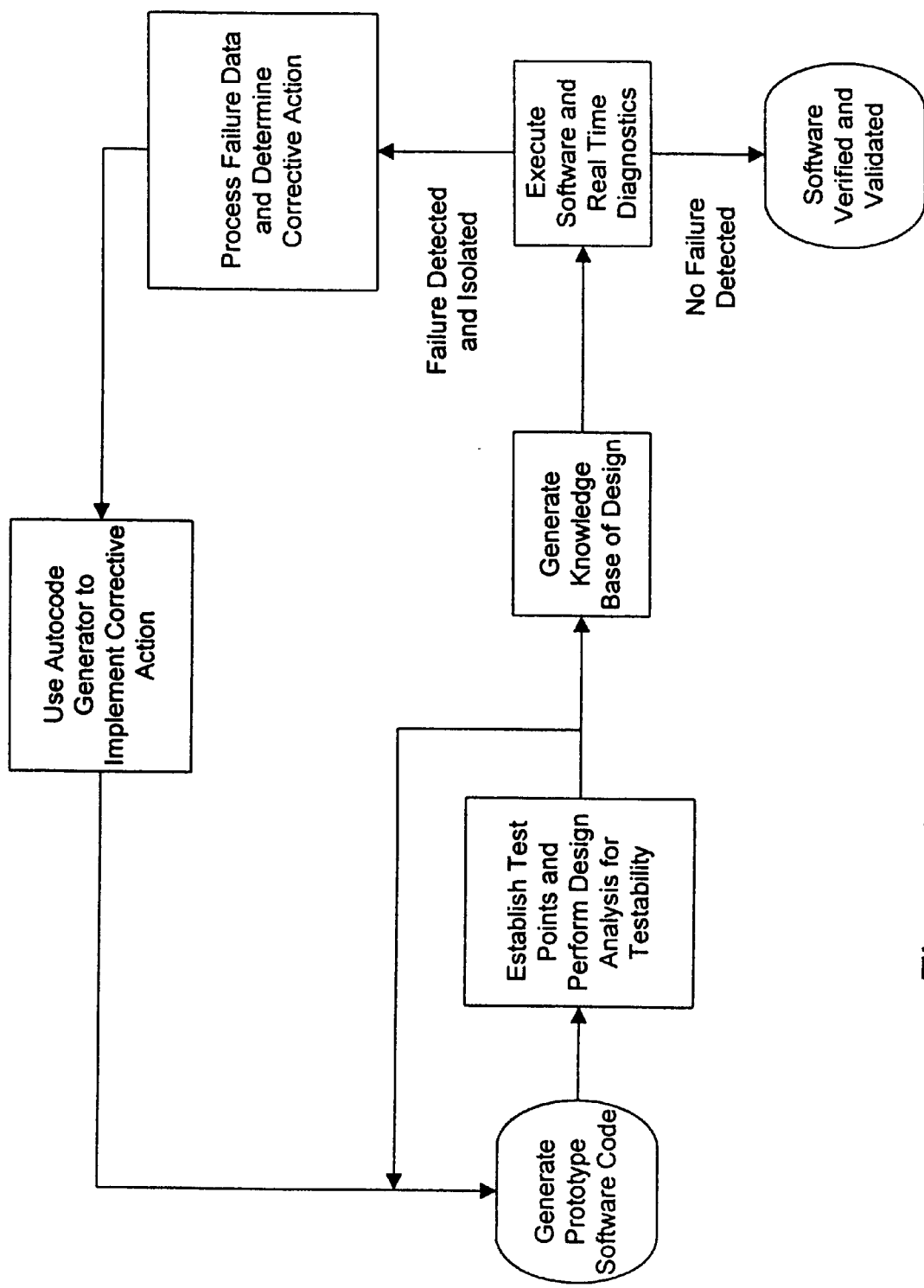
FIG. 10 is a flow chart illustrating a method in accordance with another alternative embodiment of the present invention.

The process of the present invention may be expanded to incorporate automated corrective action through the use of autocode generation, such as disclosed in the closed-loop corrective action methodology illustrated in FIG. 10.

The method of the present invention can be extended to most if not all known forms of software code generation where the software design can be represented as a functional block diagram, and can provide a universal environment for debugging software programs that contain subprograms written in different languages. Although real-time cross compilers are presently in frequent use, modern and future environments, such as Internet applications, will likely increasingly incorporate multiple code sources for implementing cross platform applications. For example, one high level program may be written in Java for multi-hardware platform compatibility on the Internet, but the Java mother program may contain embedded sibling programs that execute in different native codes, such as Fortran, C, C++, Basic, etc., once the Java program arrives at its Internet destination.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A method of locating a source failure test point among a plurality of test points in a computer program, the source failure test point having a greatest probability of being an originating source of failure among the plurality of test points, the method comprising the following steps:

ranking the plurality of test points in the computer program in accordance with an order of execution and a data dependency of each of the plurality of test points, to thereby define a ranked group of test points, the step of ranking comprising:

grouping lines of code of the computer program into functional blocks;

identifying inputs and outputs for each functional block;

creating a block diagram showing the interconnectivity of the functional blocks;

identifying dependency sets in the block diagram, each dependency set (fault dependency set) defining a fault propagation path, which indicates a flow of data or program operation through a number of the functional blocks;

defining a run time test point data file, the run time test point data file storing output values of test points during execution of the computer program; and defining a dependency set matrix, the dependency set matrix defining at least one dependency set;

generating expected values for the plurality of test points for an expected, proper-operation execution of the computer program;

executing the computer program on a computer to thereby generate actual values for the plurality of test points;

comparing the expected values for the plurality of test points with the actual values for the plurality of test points;

identifying a plurality of failed test points, each failed test point having an actual value which does not correspond with an expected value for the test point;

locating at least one source failure test point in the plurality of failed test points, using the ranked group of test points, the at least one source failure test point being an earliest failed test point, in the order of execution and data dependency, among the ranked group of test points.

2. The method as recited in claim 1, wherein the ranking step includes a step of defining at least one fault propagation path.

3. The method as recited in claim 1, wherein:

the plurality of failed test points corresponds to a single ranked group of test points, the single ranked group of test points defining a fault dependency set.

4. The method as recited in claim 1, wherein:

the plurality of failed test points corresponds to a plurality of ranked groups of test points, each ranked group of test points defining a separate fault dependency set.

5. The method as set forth in claim 4, wherein the step of locating at least one source failure test point in the plurality of failed test points comprises a step of locating at least one source failure test point in the plurality of failed test points, using the plurality of ranked groups of test points.

6. The method as set forth in claim 1, wherein the step of generating expected values for the plurality of test points comprises a step of defining a reference test point data file, the reference test point data file storing the expected values for the plurality of test points.

7. The method as set forth in claim 6, wherein the step of executing the computer program on a computer to thereby generate actual values for the plurality of test points comprises a step of storing output values of test points in the run time test point data file.

8. The method as set forth in claim 7, wherein the step of comparing the expected values for the plurality of test points with the actual values for the plurality of test points comprises a step of correlating the reference test point data file with the run time test point data file.

9. The method as set forth in claim 8, wherein the step of identifying a plurality of failed test points comprises the following steps:

defining a run time pass/fail matrix, the run time pass/fail matrix being adapted to store the plurality of failed test points; and entering the plurality of failed test points in the run time pass/fail matrix.

10. The method as set forth in claim 9, wherein the step of locating at least one source failure test point in the plurality of failed test points comprises a step of determining which dependency sets contain failed test points, using the dependency set matrix.

11. The method as set forth in claim 10, wherein the step of locating at least one source failure test point in the plurality of failed test points comprises a step of locating the at least one source failure test point in the plurality of failed test points, using the dependency sets in the dependency set matrix that were determined to contain failed test points.

12. The method as set forth in claim 10, wherein the step of locating at least one source failure test point in the plurality of failed test points comprises the following steps:

defining a fault detection set matrix, the fault detection set matrix being adapted to store dependency sets therein;

storing the dependency sets that contain failed test points in the fault detection set matrix;

determining which dependency sets in the fault detection set matrix contain the same failed test points; and locating the at least one source failure test point in the plurality of failed test points using the dependency sets that contain failed test points.

13. The method as set forth in claim 12, wherein the step of locating at least one source failure test point in the plurality of failed test points comprises the following steps:

determining whether a number of test points corresponds to a number of functional blocks; and determining a functional block that corresponds to each test point, upon a determination that the number of test points does not correspond to a number of functional blocks.

14. A method of locating a source failure test point among a plurality of test points in a computer program, the source failure test point having a greatest probability of being a source of failure in the computer program, the method comprising the following steps:

ranking the plurality of test points in accordance with an order of data dependency of the test points, to define a ranked group of test points, wherein a highest ranked test point in the ranked group of test points is not dependent on any test point in the ranked group of test points, and wherein a lowest ranked test point in the ranked group of test points is ultimately dependent on all of the test points in the ranked group of test points, wherein the step of ranking comprises:

grouping lines of code of the computer program into functional blocks;

identifying inputs and outputs for each functional block;

creating a block diagram showing the interconnectivity of the functional blocks;

identifying dependency sets in the block diagram, each dependency set defining a fault propagation path, which indicates a flow of data or program operation through a number of the functional blocks;

defining a run time test point data file, the run time test point data file storing output values of test points during execution of the computer program; and defining a dependency set matrix, the dependency set matrix defining at least one dependency set;

generating expected values for the plurality of test points for an expected, proper-operation execution of the computer program;

executing the computer program on a computer to thereby generate actual values for the plurality of test points;

comparing the expected values for the plurality of test points with the actual values for the plurality of test points;

identifying a plurality of failed test points, each failed test point having an actual value which does not correspond with an expected value for the test point; and locating a source failure test point in the ranked group of test points, the source failure test point having a highest ranking among failed test points in the ranked group of test points.

15. The method as set forth in claim 14, wherein the step of generating expected values for the plurality of test points comprises a step of defining a reference test point data file, the reference test point data file storing the expected values for the plurality of test points.

16. The method as set forth in claim 15, wherein the step of executing the computer program on a computer to thereby generate actual values for the plurality of test points comprises a step of storing output values of test points in the run time test point data file.

17. The method as set forth in claim 16, wherein the step of comparing the expected values for the plurality of test points with the actual values for the plurality of test points comprises a step of correlating the reference test point data file with the run time test point data file.

18. The method as set forth in claim 17, wherein the step of identifying a plurality of failed test points comprises the following steps:

defining a run time pass/fail matrix, the run time pass/fail matrix being adapted to store the plurality of failed test points; and entering the plurality of failed test points in the run time pass/fail matrix.

19. The method as set forth in claim 18, wherein the step of locating at source failure test point in the ranked group of test points comprises the following steps:

determining which dependency sets contain failed test points, using the dependency set matrix; and locating the at least one source failure test point in the plurality of failed test points, using the dependency sets in the dependency set matrix that were determined to contain failed test points.

20. The method as set forth in claim 18, wherein the step of locating at source failure test point in the ranked group of test points comprises the following steps:

defining a fault detection set matrix, the fault detection set matrix being adapted to store dependency sets therein;

storing the dependency sets that contain failed test points in the fault detection set matrix;

determining which dependency sets in the fault detection set matrix contain the same failed test points; and locating the source failure test point in the ranked group of failed test points using the dependency sets that contain failed test points.

21. A method of selecting a source failure test point from a plurality of test points in a computer program, the source failure test point having a highest probability relative to other test points of being a source of failure in the computer program, the method comprising the following steps:

forming a test point group from the plurality of test points, wherein test points in the test point group depend from one another to define a data flow path;

ranking the test points in the test point group in accordance with an order of execution and data dependency of the test points, wherein the step of ranking comprises:

grouping lines of code of the computer program into functional blocks;

identifying inputs and outputs for each functional block;

creating a block diagram showing the interconnectivity of the functional blocks;

identifying dependency sets in the block diagram, each dependency set defining a fault propagation path, which indicates the data flow path through a number of the functional blocks;

defining a run time test point data file, the run time test point data file storing output values of test points during execution of the computer program; and defining a dependency set matrix, the dependency set matrix defining at least one dependency set;

generating expected values for the plurality of test points for an expected, proper-operation execution of the computer program;

executing the computer program on a computer to thereby generate actual values for the plurality of test points;

comparing the expected values for the plurality of test points with the actual values for the plurality of test points;

identifying a plurality of failed test points, each failed test point having an actual value which does not correspond with an expected value for the test point; and determining which of the plurality of failed test points belong to the test point group; and locating the source failure test point by finding a failed test point within the test point group which does not depend from any other failed test points within the test point group and which is earliest in execution in the data flow path relative to the other failed test points within the test point group.

22. A method of selecting a source failure test point from a plurality of test points in a computer program, the source failure test point having a highest probability relative to other test points in the computer program of being a source of failure, the method comprising the following steps:

providing a plurality of test points in a computer program, including:

grouping lines of code of the computer program into functional blocks; and identifying inputs and outputs for each functional block;

defining at least one fault propagation path, the at least one fault propagation path associating at least two of the plurality of test points in an order of data flow and data dependency within the computer program including:

creating a block diagram showing the interconnectivity of the functional blocks;

identifying a plurality of fault propagation paths in the block diagram, each fault propagation path indicating a flow of data or program operation through a number of the functional blocks;

defining a run time test point data file, the run time test point data file storing output values of test points during execution of the computer program; and defining a dependency set matrix, the dependency set matrix defining at least one fault propagation path;

generating expected values for the plurality of test points for an expected, proper-operation execution of the computer program;

executing the computer program on a computer to thereby generate actual values for the plurality of test points;

comparing the expected values for the plurality of test points with the actual values for the plurality of test points;

identifying a plurality of failed test points, each failed test point having an actual value which does not correspond with an expected value for the test point; and finding, for the at least one fault propagation path, the source failure test point which is earliest, relative to other failure test points in the at least one fault propagation path, in an order of data flow and data dependency.

23. The method as set forth in claim 22, wherein the step of generating expected values for the plurality of test points comprises a step of defining a reference test point data file, the reference test point data file storing the expected values for the plurality of test points.

24. The method as set forth in claim 22, wherein the step of executing the computer program on a computer to thereby generate actual values for the plurality of test points comprises a step of storing output values of test points in the run time test point data file.

25. The method as set forth in claim 24, wherein the step of comparing the expected values for the plurality of test points with the actual values for the plurality of test points comprises a step of correlating the reference test point data file with the run time test point data file.

26. The method as set forth in claim 25, wherein the step of identifying a plurality of failed test points comprises the following steps:

defining a run time pass/fail matrix, the run time pass/fail matrix being adapted to store the plurality of failed test points; and writing the plurality of failed test points to the run time pass/fail matrix.

27. The method as set forth in claim 26, wherein the step of finding the source failure test point comprises a step of determining which fault propagation paths contain failed test points, using the dependency set matrix.

28. The method as set forth in claim 27, wherein the step of finding the source failure test point further comprises a step of locating the at least one source failure test point in the plurality of failed test points, using the fault propagation paths in the dependency set matrix that were determined to contain failed test points.

29. The method as set forth in claim 26, wherein the step of finding the source failure test point comprises the following steps:

defining a fault detection set matrix, the fault detection set matrix being adapted to store fault propagation paths therein;

storing the fault propagation paths that contain failed test points in the fault detection set matrix;

determining which fault propagation paths in the fault detection set matrix contain the same failed test points; and locating the at least one source failure test point in the plurality of failed test points using the fault propagation path that contain failed test points.

30. A method of determining a source failure test point from a plurality of test points in a computer program, the source failure test point having a highest probability relative to other test points in the computer program of being a source of failure, the method comprising the following steps:

determining a sequential flow of data among a plurality of test points in a computer program, including:

grouping lines of code of the computer program into functional blocks;

identifying inputs and outputs for each functional blocks; and creating a block diagram showing the interconnectivity of the functional blocks;

ranking the plurality of test points, using the determined sequential flow of data, in an order of an earliest test point in the determined sequential flow of data to a last test point in the determined sequential flow of data, to thereby generate a ranked set of test points, the step of ranking including:

identifying dependency sets in the block diagram, each dependency set indicating a flow of data or program operation through a number of the functional blocks;

defining a run time point data file, the run time test point data file storing output values of test points during execution of the computer program; and defining a dependency set matrix, the dependency set matrix defining at least one dependency set;

generating expected values for the plurality of test points for an expected, proper-operation execution of the computer program;

executing the computer program on a computer to thereby generate actual values for the plurality of test points;

comparing the expected values for the plurality of test points with the actual values for the plurality of test points;

identifying a plurality of failed test points from among the plurality of test points, each failed test point having an actual value which does not correspond with an expected value for the test point and thereby indicating an erroneous program operation or result of the computer program at the failed test point; and determining a failed test point of the plurality of failed test points which ranks earliest among failed test points in the ranked set of test points, the earliest-ranked failed test point being the source failure test point.

31. The method as set forth in claim 30, wherein the step of generating expected values for the plurality of test points comprises a step of defining a reference test point data file, the reference test point data file storing the expected values for the plurality of test points.

32. The method as set forth in claim 31, wherein the step of executing the computer program on a computer to thereby generate actual values for the plurality of test points comprises a step of writing output values of test points to the run time test point data file.

33. The method as set forth in claim 32, wherein the step of comparing the expected values for the plurality of test points with the actual values for the plurality of test points comprises a step of correlating the reference test point data file with the run time test point data file.

34. The method as set forth in claim 33, wherein the step of identifying a plurality of failed test points comprises the following steps:

defining a run time pass/fail matrix, the run time pass/fail matrix being adapted to store the plurality of failed test points; and writing the plurality of failed test points to the run time pass/fail matrix.

35. The method as set forth in claim 34, wherein the step of locating at least one source failure test point in the plurality of failed test points comprises the following steps:

defining a fault detection set matrix, the fault detection set matrix being adapted to store dependency sets therein;

storing the dependency sets that contain failed test points in the fault detection set matrix;

determining which dependency sets in the fault detection set matrix contain the same failed test points; and locating the at least one source failure test point in the plurality of failed test points using the dependency sets that contain failed test points.

36. The method as set forth in claim 34, wherein the step of locating at least one source failure test point in the plurality of failed test points comprises the following steps:

determining which dependency sets contain failed test points, using the dependency set matrix; and locating the at least one source failure test point in the plurality of failed test points, using the dependency sets in the dependency set matrix that were determined to contain failed test points.

37. A method of locating a source failure test point among a plurality of test points, the source failure test point having a greatest probability of being a source of failure in a computer program, the method comprising the following steps:

placing a plurality of test points into a computer program;

determining an order of data flow among the plurality of test points, the order of data flow defining at least one data propagation path among the plurality of test points, the step of determining including:

grouping lines of code of the computer program into functional blocks;

identifying inputs and outputs for each functional block;

creating a block diagram showing the interconnectivity of the functional blocks;

identifying data propagation paths in the block diagram, each data propagation path defining a fault propagation path, which indicates a flow of data or program operation through a number of functional blocks;

defining a run time test point data file, the run time test point data file storing output values of test points during execution of the computer program; and defining a dependency set matrix, the dependency set matrix defining at least one data propagation path;

generating expected values for the plurality of test points for an expected, proper-operation execution of the computer program;

executing the computer program on a computer to thereby generate actual values for the plurality of test points;

comparing the expected values for the plurality of test points with the actual values for the plurality of test points;

identifying at least two failed test points from the plurality of test points, each failed test point having an actual value which does not correspond with an expected value for the test point; and associating the at least two failed test points with the at least one data propagation path; and locating the source failure test point from among the at least two associated failed test points by selecting a failed test point which is earliest in the at least one data propagation path.

38. The method as set forth in claim 31, wherein the step of generating expected values for the plurality of test points comprises a step of defining a reference test point data file, the reference test point data file storing the expected values for the plurality of test points.

39. The method as set forth in claim 38, wherein the step of executing the computer program on a computer to thereby generate actual values for the plurality of test points comprises a step of storing output values of test points in the run time test point data file.

40. The method as set forth in claim 39, wherein the step of comparing the expected values for the plurality of test points with the actual values for the plurality of test points comprises a step of correlating the reference test point data file with the run time test point data file.

41. The method as set forth in claim 40, wherein the step of identifying at least two failed test points comprises the following steps:

defining a run time pass/fail matrix, the run time pass/fail matrix being adapted to store the plurality of failed test points; and entering the plurality of failed test points in the run time pass/fail matrix.

42. The method as set forth in claim 41, wherein the step of associating the at least two failed test points with the at least one data propagation path comprises a step of determining which data propagation paths contain failed test points, using the dependency set matrix.

43. The method as set forth in claim 42, wherein the step of locating the source failure test point comprises a step of locating the source failure test point, using the data propagation paths in the dependency set matrix that were determined to contain failed test points.

\* \* \* \* \*